United States Patent
Hsia et al.

(10) Patent No.: US 6,957,313 B2
(45) Date of Patent: Oct. 18, 2005

(54) MEMORY MATRIX AND METHOD OF OPERATING THE SAME

(76) Inventors: James R. Hsia, 1722 Pebble Beach Ct., Milpitas, CA (US) 95035-7608; Yan Chiew Chow, 51 Robert Rd., Orinda, CA (US) 94563-3251

( * ) Notice: Subject to any disclaimer, the term of this patent is extended or adjusted under 35 U.S.C. 154(b) by 459 days.

(21) Appl. No.: 10/007,418

(22) Filed: Nov. 30, 2001

(65) Prior Publication Data

US 2002/0069337 A1 Jun. 6, 2002

Related U.S. Application Data

(60) Provisional application No. 60/250,812, filed on Dec. 1, 2000.

(51) Int. Cl.$^7$ .............................................. G06F 12/00
(52) U.S. Cl. ......................... 711/170; 711/121; 710/22; 707/2
(58) Field of Search .............................. 707/2, 10, 202, 707/204, 205; 709/201, 213, 217, 220; 710/22; 711/104, 112, 114, 147, 156, 162, 170, 173, 121; 714/6, 47, 52, 758, 759, 769, 770, 773, 777, 14, 22; 713/300, 340

(56) References Cited

U.S. PATENT DOCUMENTS

| | | | |
|---|---|---|---|
| 4,661,900 A | * | 4/1987 | Chen et al. ..................... 712/4 |
| 4,901,230 A | * | 2/1990 | Chen et al. ................... 711/149 |
| 5,321,697 A | | 6/1994 | Fromm et al. |
| 5,471,603 A | | 11/1995 | Yokote et al. |
| 5,526,507 A | | 6/1996 | Hill |
| 5,708,769 A | * | 1/1998 | Stallmo .......................... 714/6 |
| 5,790,773 A | | 8/1998 | DeKoning et al. |
| 5,890,207 A | | 3/1999 | Sne et al. |
| 5,893,919 A | * | 4/1999 | Sarkozy et al. .............. 711/114 |
| 5,987,627 A | | 11/1999 | Rawlings, III |
| 6,021,464 A | * | 2/2000 | Yao et al. ..................... 711/114 |
| 6,070,182 A | | 5/2000 | Rao et al. |
| 6,195,754 B1 | * | 2/2001 | Jardine et al. .............. 713/324 |
| 6,351,838 B1 | | 2/2002 | Amelia |
| 6,370,611 B1 | * | 4/2002 | Callison et al. ............. 711/105 |
| 6,381,674 B2 | | 4/2002 | DeKoning et al. |
| 6,530,035 B1 | * | 3/2003 | Bridge ........................... 714/6 |
| 6,571,351 B1 | * | 5/2003 | Mitaru et al. ................... 714/6 |

* cited by examiner

*Primary Examiner*—Donald Sparks
*Assistant Examiner*—Christian P. Chace
(74) *Attorney, Agent, or Firm*—Dorsey & Whitney LLP

(57) ABSTRACT

An apparatus and method for storing, manipulating, processing, and transferring data in a memory matrix (105). The matrix (105) includes a number of multi-ported memory devices (250) arranged in banks (260), each of the devices capable of storing data, a memory controller (265) for accessing the devices, and a cache (270) with an allocation table stored therein to describe data stored in the matrix. Preferably, the matrix (105) is used in a modular, network-centric memory system (100), which has a management module (125) to interface between the matrix and a network (120) of data processing systems (115), the network based on either physical or wireless connections. Optionally, the system (100) further includes a non-volatile storage module (130), an off-line storage module (135), and an uninterruptible power supply (140). In one embodiment, the management module (125) is linked to the network (120), the matrix (105), the non-volatile storage module (130), and the off-line storage module (135) through multiple switched network interfaces with link failover and failback capability to provide high availability.

22 Claims, 12 Drawing Sheets

MEMORY SUBSYSTEM

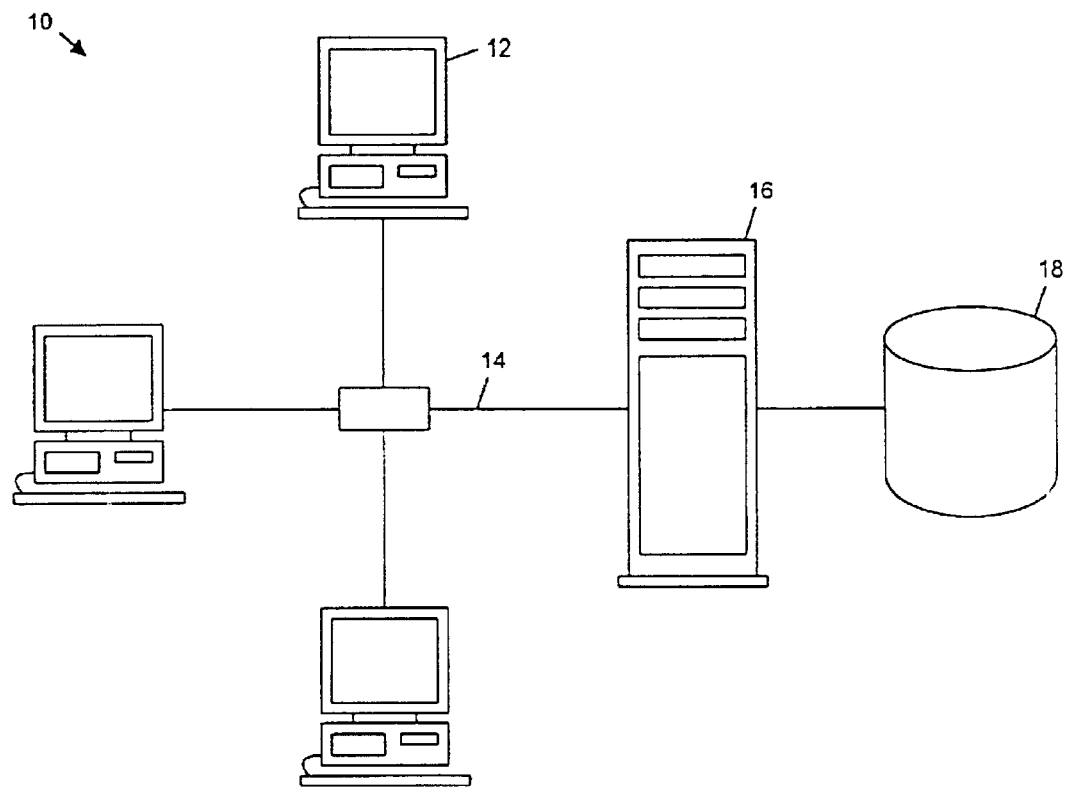
FIG. 1 - SERVER ATTACHED STORAGE (SAS)
(PRIOR ART)

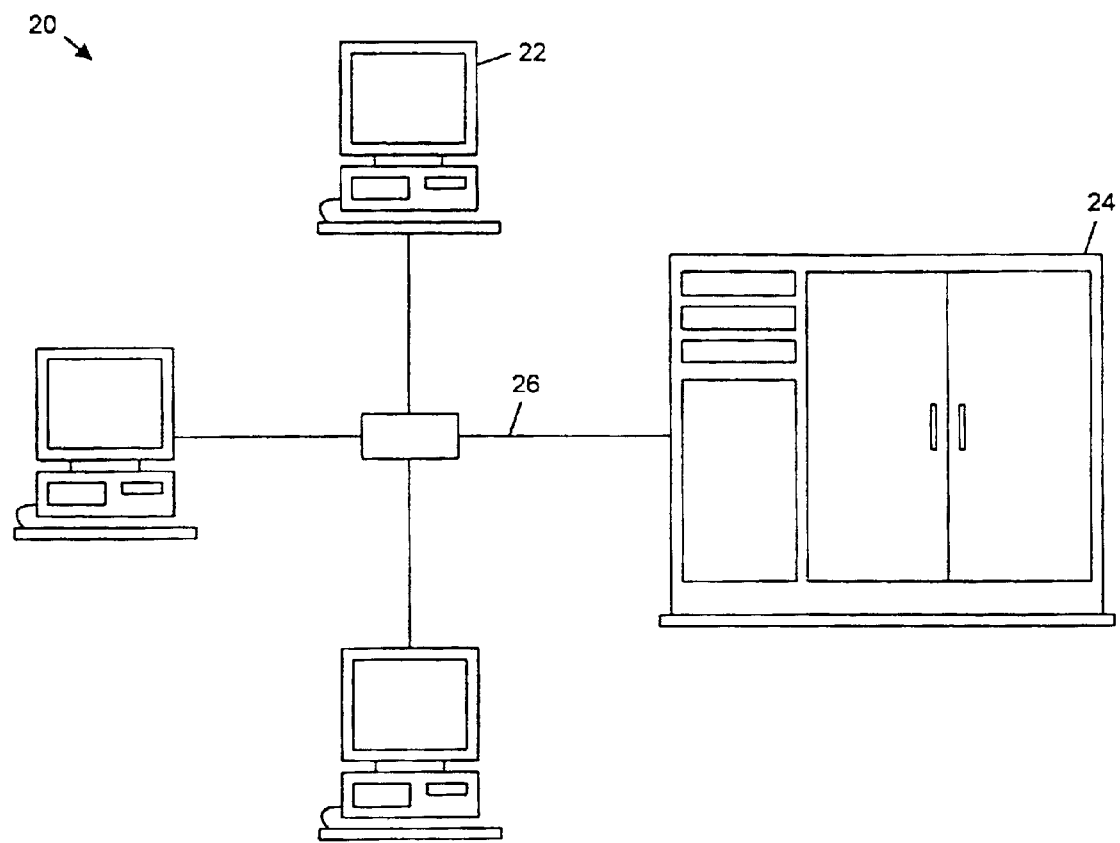
FIG. 2 - NETWORK ATTACHED STORAGE (NAS)
(PRIOR ART)

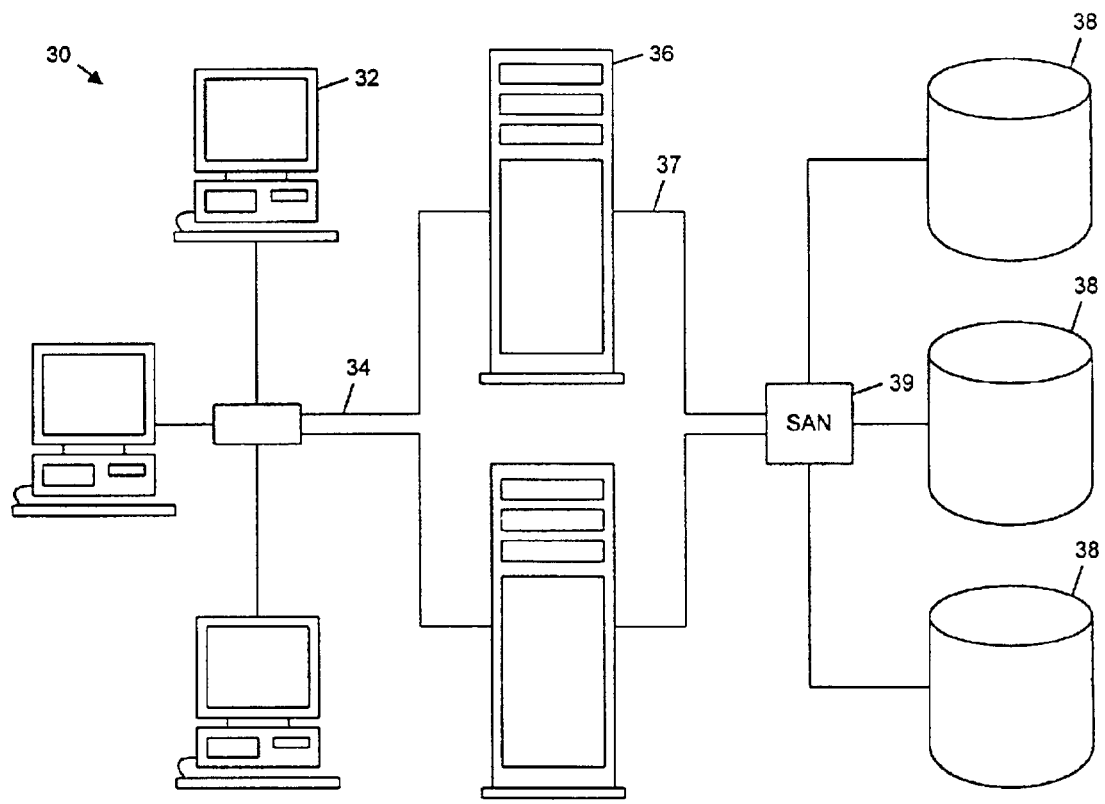
FIG. 3 - STORAGE AREA NETWORK (SAN)
(PRIOR ART)

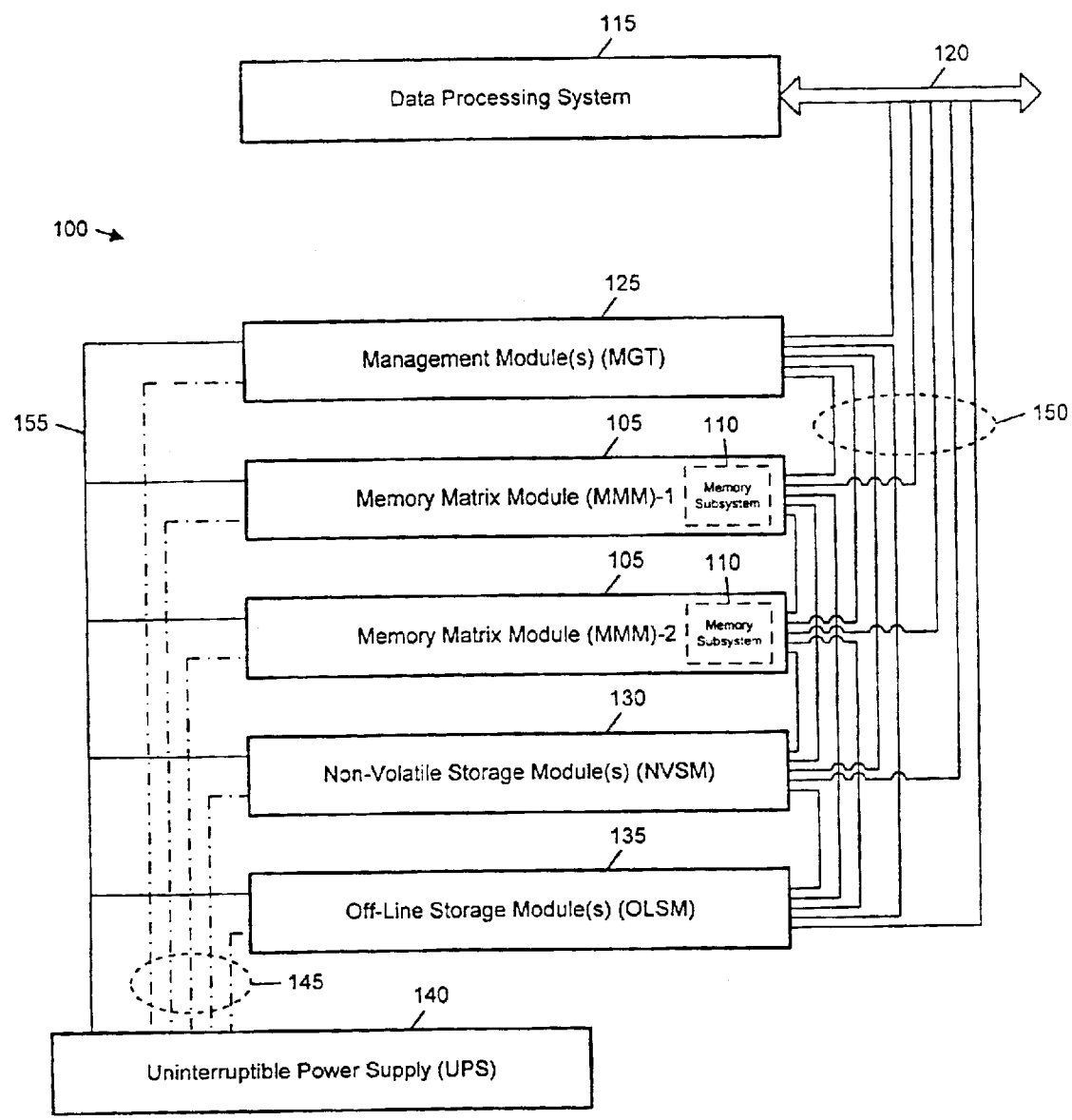
FIG. 4 - MEMORY MATRIX SYSTEM COMPONENTS
(NAS CONFIGURATION)

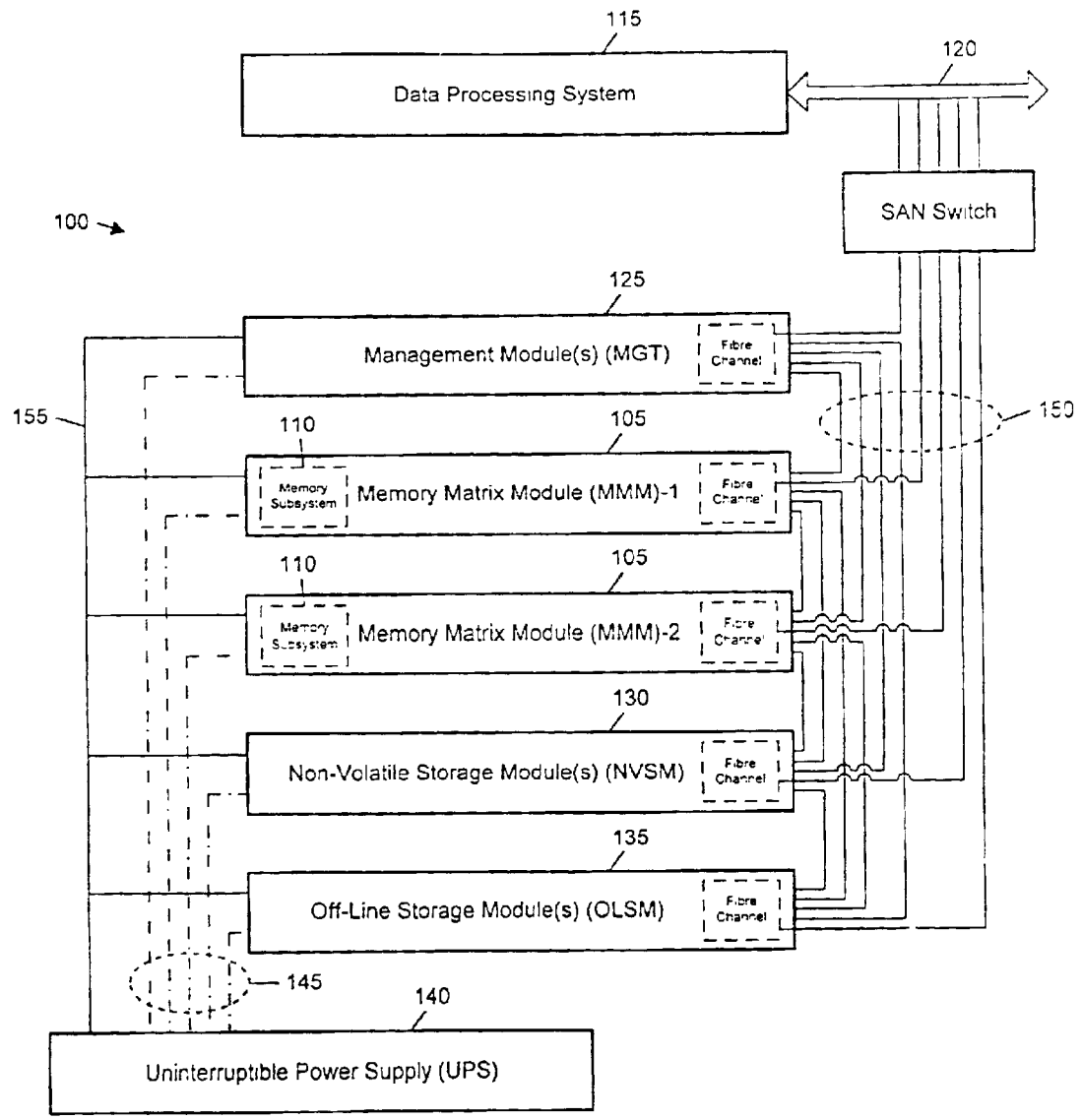
FIG. 5 - MEMORY MATRIX SYSTEM COMPONENTS
(SAN CONFIGURATION)

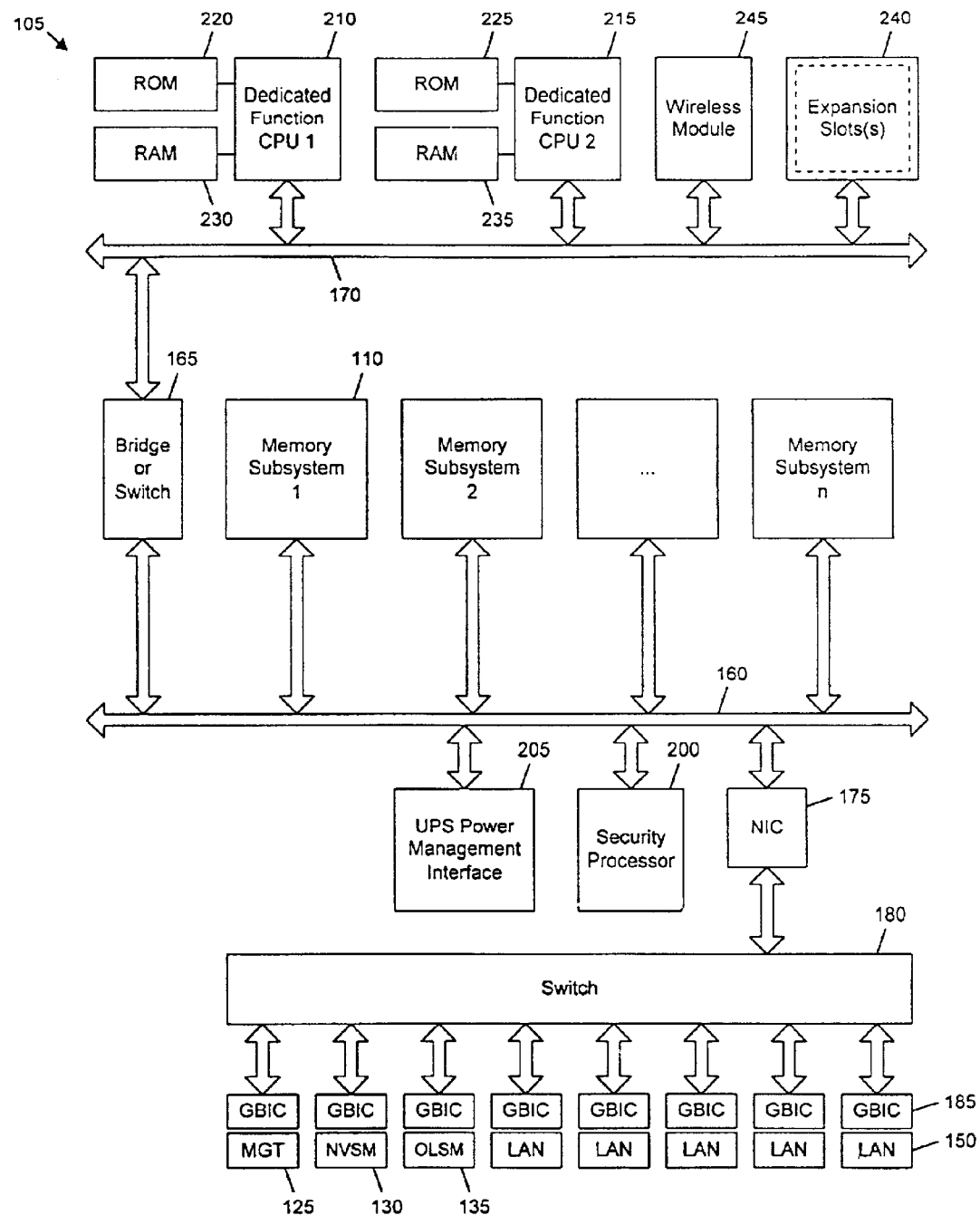
FIG. 6 - MEMORY MATRIX MODULE (MMM)

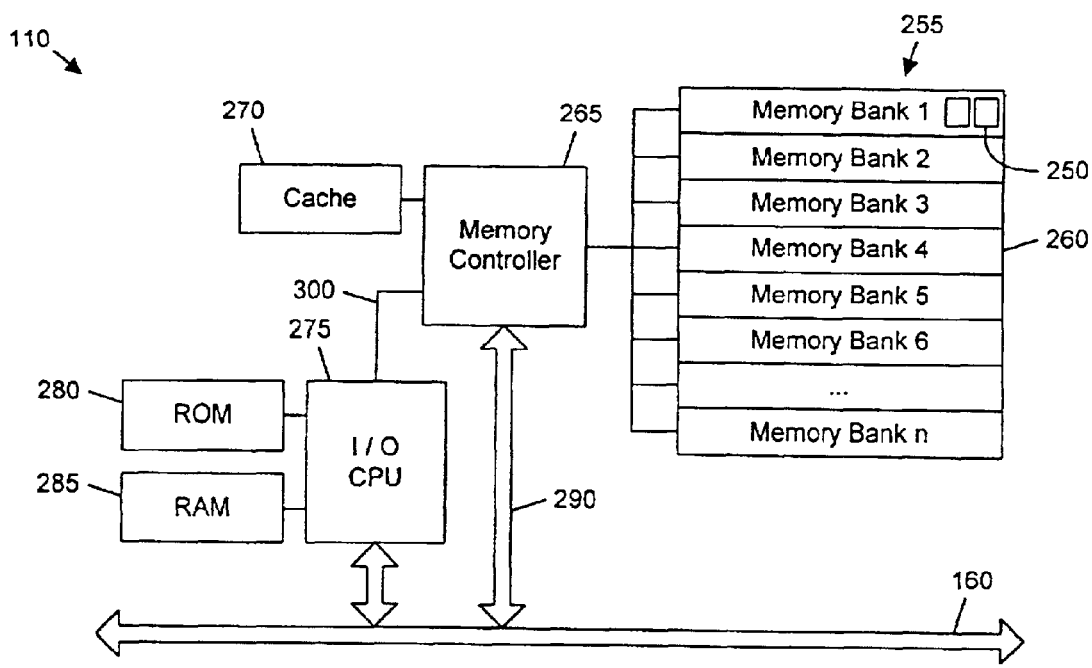
FIG. 7 - MEMORY SUBSYSTEM

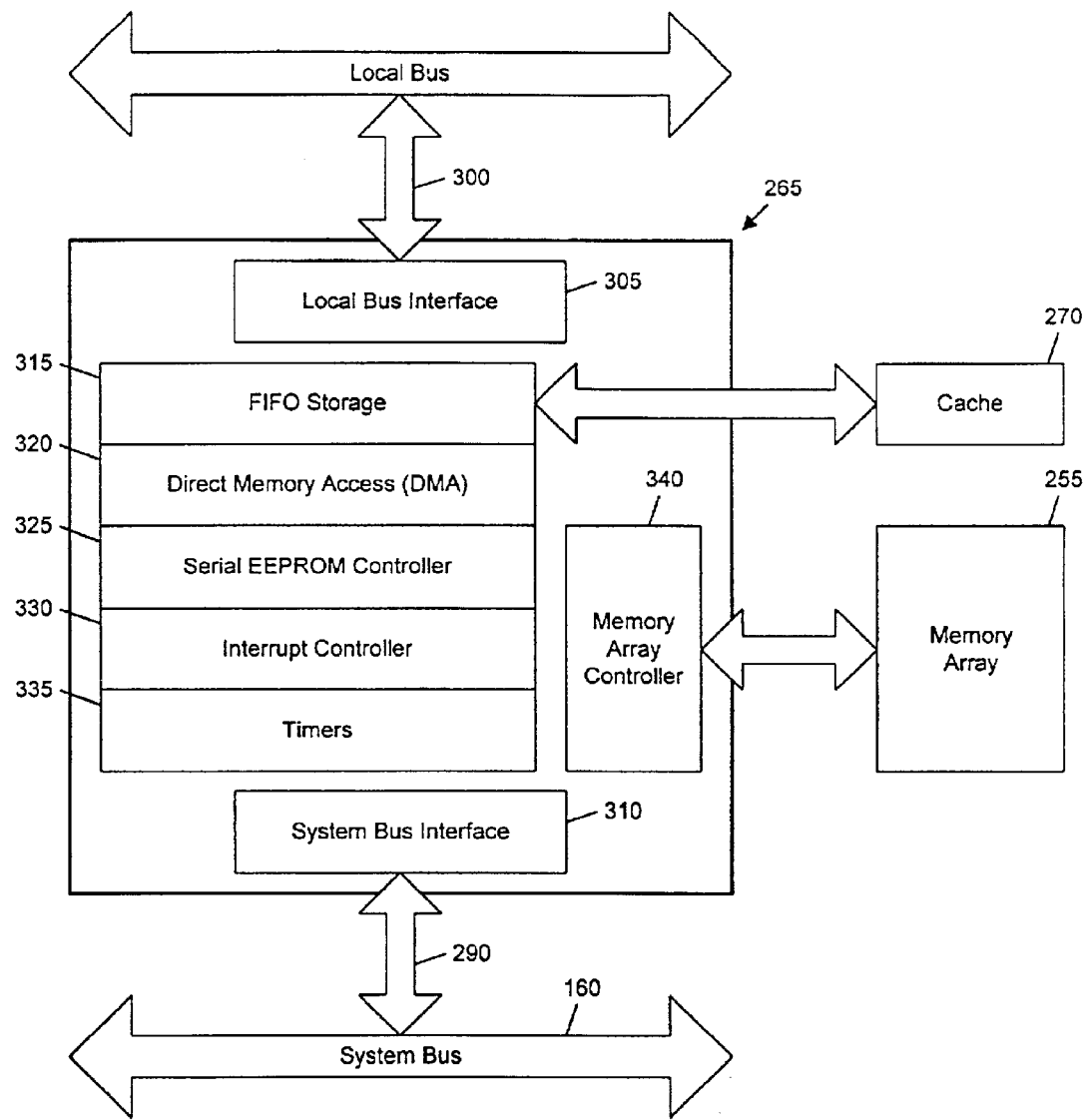
FIG. 8 - MEMORY CONTROLLER

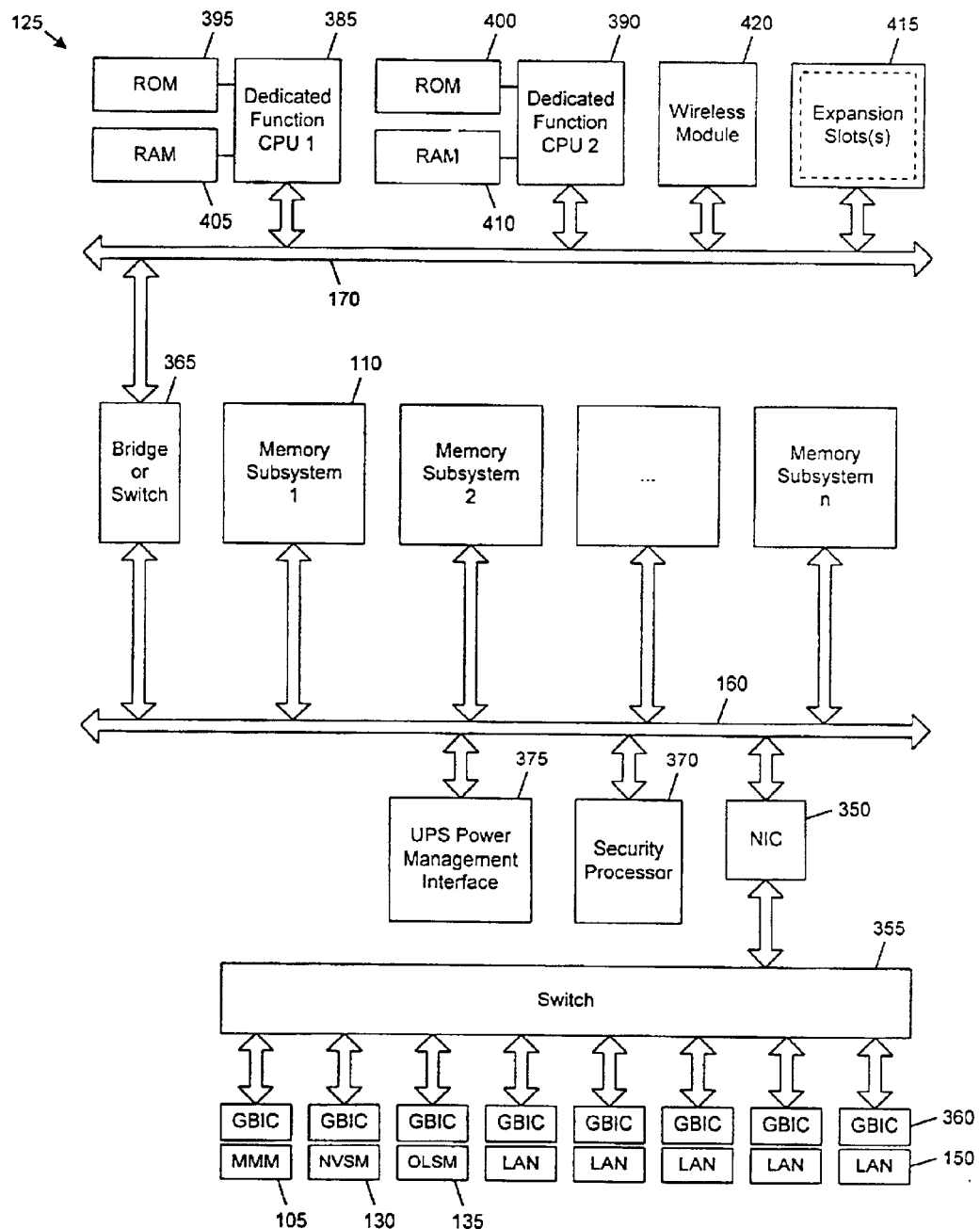
FIG. 9 - MANAGEMENT MODULE (MGT)

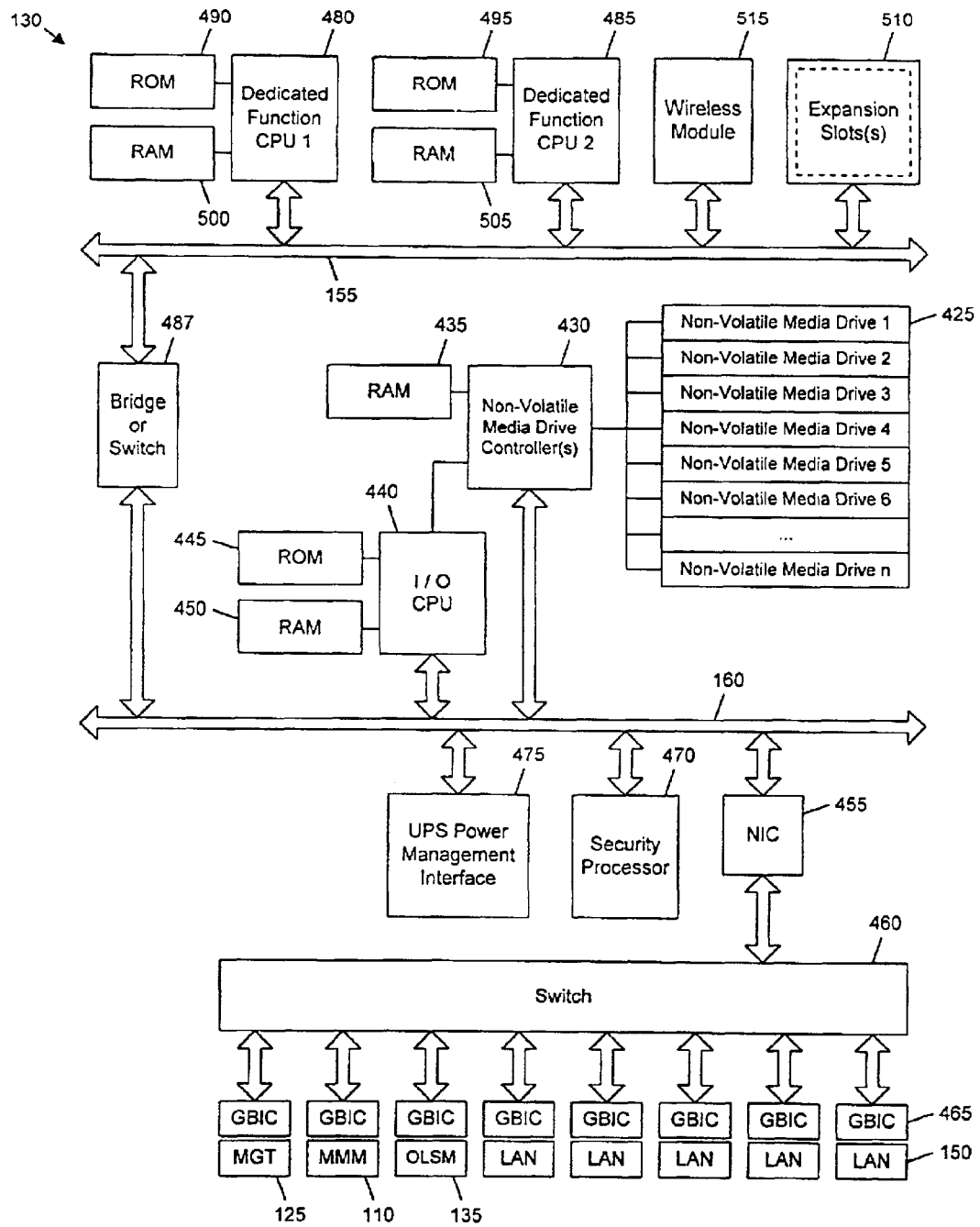
FIG. 10 - NON-VOLATILE STORAGE MODULE (NVSM)

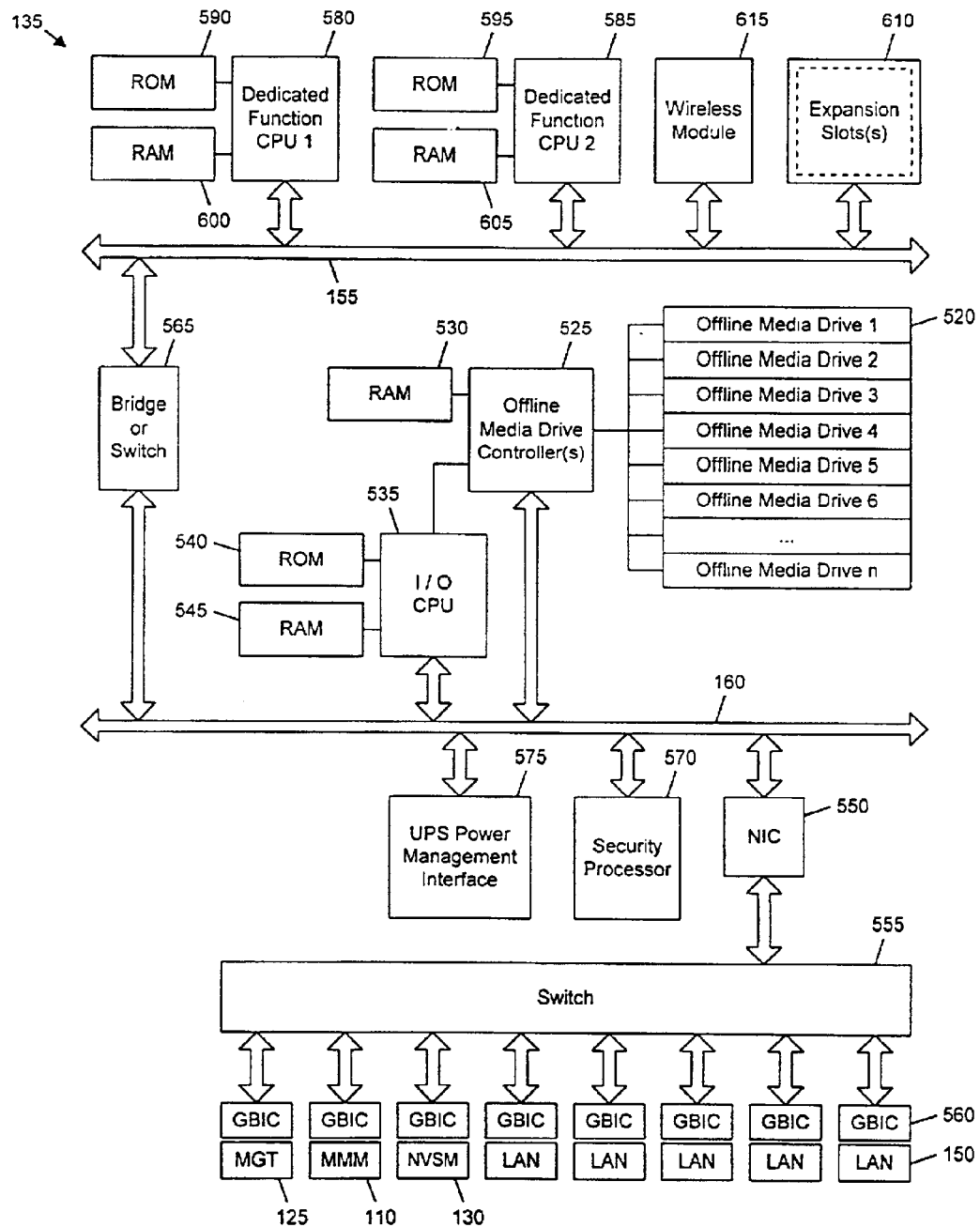
FIG. 11 - OFF-LINE STORAGE MODULE (OLSM)

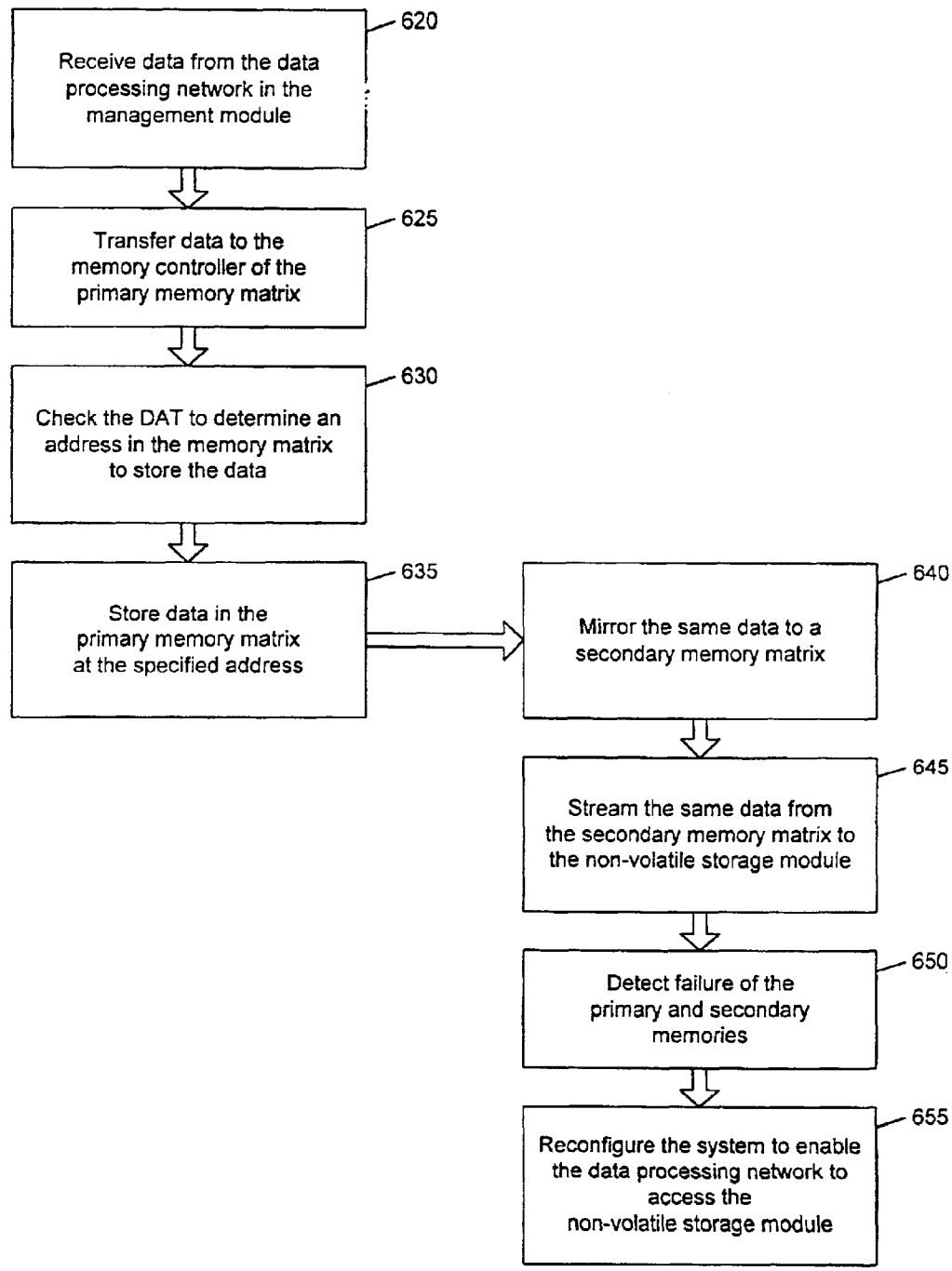
FIG. 12 - METHOD FOR OPERATION OF MEMORY SYSTEM

MEMORY MATRIX AND METHOD OF OPERATING THE SAME

CROSS REFERENCE TO RELATED APPLICATIONS

This application claims priority from U.S. Provisional Patent Application Ser. No. 60/250,812 entitled a Memory Matrix and Method of Operating the Same, filed Dec. 1, 2000.

FIELD

The present invention relates generally to data storage or memory systems, and more particularly to a method and an apparatus for storing, manipulating, processing, and transferring data in a memory matrix.

BACKGROUND

Computers are widely used for storing, manipulating, processing, and displaying various types of data, including financial, scientific, technical and corporate data, such as names, addresses, and market and product information. Thus, modern data processing systems generally require large, expensive, fault-tolerant memory or data storage systems. This is particularly true for computers interconnected by networks such as the Internet, wide area networks (WANs), and local area networks (LANs). These computer networks already store, manipulate, process, and display unprecedented quantities of various types of data, and the quantity continues to grow at a rapid pace.

Several attempts have been made to provide a data storage system that meets these demands. One, illustrated in FIG. 1, involves a server attached storage (SAS) architecture 10. Referring to FIG. 1, the SAS architecture 10 typically includes several client computers 12 attached via a network 14 to a server 16 that manages an attached data storage system 18, such as a disk storage system. The client computers 12 access the data storage system 18 through a communications protocol such as, for example, TCP/IP protocol. SAS architectures have many advantages, including consolidated, centralized data storage for efficient file access and management, and cost-effective shared storage among several client computers 12. In addition, the SAS architecture 10 can provide high data availability and can ensure integrity through redundant components such as a redundant array of independent/inexpensive disks (RAID) in data storage system 18.

Although an improvement over prior art data storage systems in which data is duplicated and maintained separately on each computer 12, the SAS architecture 10 has serious shortcomings. The SAS architecture 10 is a defined network architecture that tightly couples the data storage system 18 to operating systems of the server 16 and client computers 12. In this approach the server 16 must perform numerous tasks concurrently including running applications, manipulating databases in the data storage system 18, file/print sharing, communications, and various overhead or housekeeping functions. Thus, as the number of client computers 12 accessing the data storage system 18 is increased, response time deteriorates rapidly. In addition, the SAS architecture 10 has limited scalability and cannot be readily upgraded without shutting down the entire network 14 and all client computers 12. Finally, such an approach provides limited backup capability since it is very difficult to backup live databases.

Another related approach is a network attached storage (NAS) architecture 20. Referring to FIG. 2, a typical NAS architecture 20 involves several client computers 22 and a dedicated file server 24 attached via a local area network (LAN 26). The NAS architecture 20 has many of the same advantages as the SAS architecture 10 including consolidated, centralized data storage for efficient file access and management, shared storage among a number of client computers 22, and separate storage from an application server (not shown). In addition, the NAS architecture 20 is independent of an operating system of the client computers 22, enabling the file server 24 to be shared by heterogeneous client computers and application servers. This approach is also scalable and accessible, enabling additional storage to be easily added without disrupting the rest of the network 26 or application servers.

A third approach is the storage area network (SAN) architecture 30. Referring to FIG. 3, a typical SAN architecture 30 involves client computers 32 connected to a number of servers 36 through a data network 34. The servers are connected through separate connections 37 to a number of storage devices 38 through a dedicated storage area network 39 and its SAN switches and routers, which typically use the Fibre Channel-Arbitrated Loop protocol. Like NAS, SAN architecture 30 offers consolidated centralized storage and storage management, and a high degree of scalability. Importantly, the SAN approach removes storage data traffic from the data network and places it on its own dedicated network, which eases traffic on the data network, thereby improving data network performance considerably.

Although both the NAS 20 and the SAN 30 architectures are an improvement over SAS architecture 10, they still suffer from significant limitations. Currently, the storage technology most commonly used in SAS 10, NAS 20, and SAN 30 architectures is the hard disk drive. Disk drives include one or more rotating physical disks having magnetic media coated on at least one, and preferably both, sides of each disk. A magnetic read/write head is suspended above each side of each disk and made to move radially across the surface of the disk as it is rotated. Data is magnetically recorded on the disk surfaces in concentric tracks.

Disk drives are capable of storing large amounts of data, usually on the order of hundreds or thousands of megabytes, at a low cost. However, disk drives are slow relative to the speed of processors and circuits in the client computers 12, 22. Thus, data retrieval is slowed by the need to repeatedly move the read/write heads over the disk and the need to rotate the disk in order to position the correct portion of the disk under the head. Moreover, hard disk drives also tend to have a limited life due to physical wear of moving parts, a low tolerance to mechanical shock, and significantly higher power requirements in order to rotate the disk and move the read/write heads. Some attempts have been made to rectify these problems including the use of cache servers to buffer data written to or read from hard disk drives, redundant or parity disks as in RAID systems, and server clusters utilizing load balancing with mirrored hard disk drives. However, none of these solutions are completely satisfactory. Cache servers only improve perceived performance for static data stored in cache memory. They do not improve performance for the 40 to 50 percent of data requests that result in cache misses. RAID configurations with their multiple disk drives are also subject to mechanical wear and tear, as well as head seek and rotational latencies or delays. Similarly, even server clusters with load balancing switches are helpful only for multiple read access; write access is not improved. Moreover, cluster management also adds to the system overhead, thereby reducing any increased performance realized.

As a result of the shortcomings of disk drives, and of advancements in semiconductor fabrication techniques made in recent years, solid-state drives (SSDs) using non-mechanical Random Access Memory (RAM) devices are being introduced to the marketplace. RAM devices have data access times on the order of less than 50 microseconds, much faster than the fastest disk drives. To maintain system compatibility, SSDs are typically configured as disk drive emulators or RAM disks. A RAM disk uses a number of RAM devices and a memory-resident program to emulate a disk drive. Like a disk drive a RAM disk typically stores data as files in directories that are accessed in a manner similar to that of a disk drive.

Prior art SSDs are also not wholly satisfactory for a number of reasons. First, unlike a physical hard disk drive, a RAM disk forgets all stored data when the computer is turned off. The requirement to maintain power to keep data alive is problematic with SSDs that are generally used as disk drive replacements in servers or other computers. Also, SSDs do not presently provide the high densities and large memory capacities that are required for many computer applications. Currently, the largest SSD capacity available is 37.8 gigabytes (GB). SSDs having a 3.5 inch form factor, preferred to make them directly interchangeable with standard hard disk drives, are limited to a mere 3.2 GB. Moreover, existing SSDs operate in a mode emulating a conventional disk controller, typically using a Small Computer System Interface (SCSI) or Advanced Technology Attachment (ATA) standard for interfacing between the SSD and a client computer. Thus, encumbered by the limitations of disk controller emulation, hard disk circuitry, and ATA or SCSI buses, existing SSDs fail to take full advantage of the capabilities of RAM devices.

Accordingly, there is a need for a data storage system with a network centered architecture that has a large data handling capacity, short access times, and maximum flexibility to accommodate various configurations and application scenarios. It is desirable that such a data storage system is scalable, fault-tolerant, and easily maintained. It is further desirable that the data storage system provide non-volatile backup storage, off-line backup storage, and remote management capabilities. The present invention provides these and other advantages over the prior art.

SUMMARY

The present invention provides a network attached memory system based on volatile memory devices, such as Random Access Memory (RAM) devices, and a method of operating the same to store, manipulate, process, and transfer data.

It is a principal object of the present invention to provide a memory system that combines both volatile and non-volatile storage technologies to take advantage of the strengths of each type of memory.

It is a further object of the present invention to provide such memory system for use in a data processing network or data network, the data network based on either physical wire connections or wireless connections, without the need of any significant alteration in the data network, in data processing systems attached thereto, or in the operating system and applications software of either.

It is still a further object of the present invention to provide a fault-tolerant memory system having real-time streaming backup of data stored in memory without adversely affecting the data network or attached data processing systems.

In one aspect, the present invention is directed to a memory matrix module for use in or with a data network. The memory matrix module includes at least one memory array having a number of memory devices arranged in a number of banks, and each memory device capable of storing data therein. The memory matrix module further includes a memory controller connected to the memory array and capable of accessing the memory devices, and a cache connected to the memory controller. One or more copies of a file or data allocation table (DAT) stored in the cache are adapted to describe files and directories of data stored in the memory devices. Preferably, each of the banks has multiple ports, and the multiple ports and the DAT in the cache are configured to enable the memory controller to access different memory devices in different banks simultaneously. Also preferably, data stored in memory devices can be processed by the memory controller using block data manipulation, wherein data stored in blocks of addresses rather than in individual addresses are manipulated, yielding additional performance improvement. More preferably, the memory matrix module is part of a memory system for use in a data network including several data processing systems based on either physical wire or wireless connections. Most preferably, the memory matrix module is configured to enable different data processing systems to read or write to the memory array simultaneously.

Generally, the memory array, memory controller and cache are included within one of a number of memory subsystems within the memory matrix module. The memory subsystem includes, in addition to the memory array, memory controller, and cache, an input and output processor or central processing unit (I/O CPU) connected to the memory controller, a read-only memory (ROM) device connected to the I/O CPU, the ROM device having stored therein an initial boot sequence to boot the memory subsystem, a RAM device connected to the I/O CPU to provide a buffer memory to the I/O CPU, and a switch connected to the I/O CPU through an internal system bus and a network interface controller (NIC). The memory subsystem is further connected through the switch and a local area network (LAN) or data bus to the data network and other memory system modules, which include other memory matrix modules (MMM), memory management modules (MGT), non-volatile storage modules (NVSM), off-line storage modules (OLSM), and uninterruptible power supplies (UPS). This data bus can be in the form of a high-speed data bus such as a high-speed backplane chassis.

Optionally, the memory matrix module can further include a secondary internal system bus connected to the primary internal system bus by a switch or bridge, additional dedicated function processors each with its own ROM and RAM devices, a wireless network module, a security processor, and one or more expansion slots connected via the internal system buses to connect alternate I/O or peripheral modules to the memory matrix module. Primary and secondary internal system buses can include, for example, a Peripheral Component Interconnect (PCI) bus.

As noted above, the memory matrix module of the present invention is particularly useful in a memory system further including at least one management module (MGT) connected to one or more memory matrix modules and to the data network to provide an interface between the memory matrix modules and the data network. The management module is connected to the memory matrix modules and other memory system modules by a LAN or data bus and by a power management bus. Generally, the management module contains a NIC connected to an internal system bus, a switch connected to the NIC, and a connection between the switch and the LAN or data bus.

Optionally, the management module further includes a second switch or bridge connecting the primary and the secondary internal system buses, and additional dedicated function processors each with their own ROM and RAM devices, a wireless network module, a security processor, and one or more expansion slots to connect alternate I/O or peripheral modules to the management module.

In one embodiment, the memory system further includes one or more non-volatile storage modules (NVSM) to provide backup of data stored in the memory matrix modules. Generally, the non-volatile storage module includes a predetermined combination of one or more magnetic, optical, and/or magnetic-optical disk drives. Preferably, the non-volatile storage module includes a number of hard disk drives. More preferably, the hard disk drives are connected in a RAID configuration to provide a desired storage capacity, data transfer rate, or redundancy. In one version of this embodiment, the hard disk drives are connected in a RAID Level 1 configuration to provide mirrored copies of data in the memory matrix. Alternatively, the hard disk drives may be connected in a RAID Level 0 configuration to reduce the time to backup data from the memory matrix. The non-volatile storage module also includes an I/O CPU, a non-volatile storage controller connected to the I/O CPU with data storage memory devices connected to the storage controller, a ROM device connected to the I/O CPU, the ROM device having stored therein an initial boot sequence to boot a non-volatile storage module configuration, a RAM device connected to the I/O CPU to provide a buffer memory to the I/O CPU, and a switch connected to the I/O CPU through a NIC, and through the network or data bus to other memory system modules and a number of data processing systems.

Optionally, the non-volatile storage module further includes a switch or bridge connecting the primary and secondary internal system buses, additional dedicated function processors each with their own ROM and RAM devices, a wireless network module, a security processor, and one or more expansion slots to connect alternate I/O or peripheral modules to the non-volatile storage module.

In one embodiment, the memory system may further include one or more off-line storage modules (OLSM) to provide a non-volatile backup of data stored in the memory matrix modules and non-volatile storage modules on a removable media. Generally, the off-line storage module includes a predetermined combination of one or more magnetic tape drives, removable hard disk drives, magnetic-optical disk drives, optical disk drives, or other removable storage technology, which provide off-line storage of data stored in the memory matrix module and/or the non-volatile storage module. In this embodiment, the management module is further configured to backup the memory matrix modules and the non-volatile storage module to the off-line storage module and its removable storage media. The off-line storage module generally includes an I/O CPU, an off-line storage controller connected to the I/O CPU and data storage memory devices connected to the memory controller. A ROM device having stored therein an initial boot sequence to boot a off-line storage module configuration is connected to the I/O CPU. A RAM device connected to the I/O CPU provides a buffer memory to the I/O CPU. The off-line storage module is further connected through an internal system bus, a NIC, a switch, and the LAN or data bus to other memory system modules and data processing systems. Optionally, the off-line storage module further includes a switch or bridge to connect the primary and secondary internal system buses, additional dedicated function processors each with their own ROM and RAM devices, a wireless network module, a security processor, and one or more expansion slots to connect alternate I/O or peripheral modules to the off-line storage module.

In another embodiment, the memory system includes an uninterruptible power supply (UPS). The UPS supplies power from an electrical power line to the other memory system modules, and in the event of an excessive fluctuation or interruption in power from the electrical power line, provides backup power from a battery. Preferably, the UPS is configured to transmit a signal over the power management bus to the management module on excessive fluctuation or interruption in power from the electrical power line, and the management module is configured to backup the memory matrix to the non-volatile storage module upon receiving the signal. More preferably, the management module is further configured to notify memory system users of the power failure and to perform a controlled shutdown of the memory system.

Upon restoration of power, the management module is further configured to restore the contents of the primary memory matrix from the most recent backup copy of the memory matrix stored in the non-volatile storage module, reactivate additional memory matrixes if previously configured as secondary backup memories, reactivate the non-volatile storage module as a secondary memory, and return the memory system to normal operating condition. If the non-volatile storage module is unavailable, the management module is further configured to restore the contents of the memory matrix directly from the most recent backup copy of the memory matrix stored in removable storage media in the off-line storage module.

In another aspect, the present invention is directed to a memory system having switched multi-channel network interfaces and real-time streaming backup. The memory system includes a memory matrix module and a non-volatile storage module capable of storing data therein, and a management module for coupling a data network to the memory matrix module via a primary network interface and to the non-volatile storage module via a secondary network interface. The management module is configured to enable the data network to access the memory matrix module during normal operation to provide a primary memory, to backup data to a secondary memory module, and to stream data from the secondary memory module to the non-volatile storage module to provide staged backup memory. Alternatively, data can be backed up directly from the primary memory to the non-volatile storage module in situations where the non-volatile storage module can accept data at a sufficiently fast rate from the primary memory, or where the data processing requirements of the primary memory permit backing up data at a rate that can be handled by the non-volatile storage module. Generally, the management module is further configured to detect failure or a non-operating condition of the primary memory, and to reconfigure the secondary network interface to enable the data network to access a secondary memory if the secondary memory is available, or to access the non-volatile storage module if the secondary memory is unavailable. Thus, the failover to the backup memory is completely transparent to a user of the data processing system. Examples of network interface standards that can be used include gigabit Ethernet, ten gigabit Ethernet, Fibre Channel-Arbitrated Loop (FC-AL), Firewire, Small Computer System Interface (SCSI), Advanced Technology Attachment (ATA), InfiniBand, HyperTransport, PCI-X, Direct Access File System (DAFS), IEEE 803.11, or Wireless Application Protocol (WAP).

In one embodiment, the management module is connected to the memory matrix via a number of network interfaces or data buses connected in parallel, the number of network interfaces or data buses configured to provide higher data transfer rates in normal operation and to provide access to the memory matrix at a reduced data transfer rate should one of the network interfaces or data buses fail.

In one aspect of the present invention, a memory system configured in a Solid State Disk (SSD) mode of operation is described. By Solid State Disk it is meant a system that provides basic data storage to and data retrieval from the memory system using one or more memory matrix modules in a configuration analogous to those of standard hard disk drives in a network storage system.

In another aspect, a memory system configured in a caching mode is described. By caching mode it is meant a system that provides a temporary memory buffer to cache data reads, writes, and requests from a data network to a data storage system in order to reduce access times for frequently accessed data, and to improve storage system response to multiple data write requests.

In yet another aspect, a memory system configured in a virtual memory paging mode is described. By virtual memory paging it is meant a staged data overflow system that provides swapping of memory pages or predetermined sections of memory in the memory of a network-connected server or other network-connected data processing device out to a memory matrix in the event of a data overflow condition wherein the storage capacity of the server or data processing device is exceeded. The system also provides swapping of memory pages or predetermined sections of memory in the memory matrix out to a non-volatile storage system in the event of a data overflow condition wherein the storage capacity of the memory matrix is exceeded. The virtual memory pages or sections thereby stored in the non-volatile storage system are then read back into the memory matrix as they are needed, and the virtual memory pages or sections stored in the memory matrix are then read back into the memory of the network-connected server or data processing device as they are needed, wherein the memory matrix and the non-volatile storage system function as staged virtual extensions of the capacity of the memory in a network-connected server or data processing device, and the non-volatile storage system also functions as a virtual extension of the capacity of the memory matrix.

In another aspect, a memory system configured in a data encryption-decryption mode is described. By encryption-decryption mode it is meant a system that encrypts data and decrypts encrypted data transmitted over a data network on the fly, using one or more publicly known and well defined encryption standards, or one or more private customized encryption-decryption schemes. Data encryption enhances the security of files transmitted over a data network, whereby an encrypted file that falls into unauthorized hands remains undecipherable.

In yet another aspect, the present invention is directed to the management module's ability to be administered in real time locally and remotely, and to perform real-time local and remote management of other management modules as well as one or more memory matrix modules coupled to the management module through a LAN, data network, or data bus. As described above, the memory matrix in the management module, in a fashion similar to the memory matrix contained in a memory matrix module, includes a number of memory devices, each capable of storing data, arranged in a number of banks, and a memory controller capable of accessing the memory devices connected to each of the banks. The memory matrix further includes a cache connected to the memory controller, the cache having stored therein a DAT adapted to describe files and directories of data stored in the memory devices. In accordance with the present invention, the memory controller is configured to provide local status reporting and management of the memory matrix independent of a data processing system connected to the management module, and remote status reporting and management of the memory matrix through a data network based on physical wire connections, such as a LAN, WAN, or the Internet, connected to the management module. Alternatively, remote status reporting and management of the management module can be accomplished through a wireless data network connection compatible with the management module's wireless network module, and independent of any other physically connected data network. In addition to management functions related to the management module, the management module is configured to provide management capabilities for other management modules and memory matrix modules coupled to the management module through a data network or data bus, the data network or data bus based on either physical wire connections or wireless connections.

In one embodiment, the memory controller is configured to detect and correct errors in data transmitted to or stored in the memory devices using, for example, ECC or a Hamming code.

In another embodiment, the system is configured to defragment data stored in memory space defined by the memory devices. Preferably, the system is configured to perform the defragmentation in a way that is substantially transparent to users of the data processing system.

In yet another embodiment, the system is configured to calculate statistics related to operation of the memory matrix and to provide the statistics to an administrator of the data processing system. The statistics can include, for example, information related to the available capacity of the memory matrix, throughput of data transferred between the memory matrix and the data processing system, or a rate at which memory matrix resources are being consumed.

In still another embodiment, the memory matrix module is part of a memory system that further includes a management module and a non-volatile storage module. The management module is configured to couple the memory matrix module to the data processing system to provide a primary memory, and to couple the non-volatile storage module to the memory matrix to provide a backup memory. Preferably, the memory controller and I/O CPU of the memory matrix module are configured to physically defragment, arrange, and optimize the data in the memory matrix prior to the data being written to the non-volatile storage module.

The advantages of a memory system of the present invention include:

(i) short data access times;
(ii) RAM block data manipulation and simultaneous parallel access capabilities resulting in fast data manipulation;
(iii) high reliability and data security;
(iv) modular, network-centric architecture that is readily expandable, scalable, and compatible with multiple network storage architectures such as NAS and SAN;
(v) real-time local and remote management that optimizes maintenance and backup operations while reducing overhead on a host server or data processing system; and (vi) ability to be flexibly configured in different low level modes of operation, some of which can run concurrently, including SSD, caching, data encryption and decryption, and others.

BRIEF DESCRIPTION OF THE DRAWINGS

These and various other features and advantages of the present invention will be apparent upon reading of the following detailed description in conjunction with the accompanying drawings, where:

FIG. 1 (prior art) is a block diagram of a conventional memory system having a server attached storage (SAS) architecture;

FIG. 2 (prior art) is a block diagram of a conventional memory system having a network attached storage (NAS) architecture;

FIG. 3 (prior art) is a block diagram of a conventional memory system having a storage area network (SAN) architecture;

FIG. 4 is a block diagram of a memory system according to an embodiment of the present invention having a network attached storage (NAS) architecture;

FIG. 5 is a block diagram of a memory system according to an embodiment of the present invention having a storage area network (SAN) architecture;

FIG. 6 is a partial block diagram of the memory system of FIG. 4 showing a memory matrix module (MMM) with several memory subsystems therein according to an embodiment of the present invention;

FIG. 7 is a block diagram of an embodiment of a memory subsystem according to an embodiment of the present invention;

FIG. 8 is a block diagram of an embodiment of a memory controller suitable for use in the memory subsystem of FIG. 7;

FIG. 9 is a block diagram of a management module (MGT) of the memory system of FIG. 4 according to an embodiment of the present invention;

FIG. 10 is a block diagram of a non-volatile storage module (NVSM) of the memory system of FIG. 4 according to an embodiment of the present invention;

FIG. 11 is a block diagram of an off-line storage module (OLSM) of the memory system of FIG. 4 according to an embodiment of the present invention; and FIG. 12 is a flowchart showing an overview of a process for operating a memory system having a memory matrix module according to an embodiment of the present invention.

DETAILED DESCRIPTION

An improved data storage or memory system having a memory matrix and a method of operating the same are provided.

An exemplary embodiment of a memory system 100 including one or more memory matrix modules (MMM) 105 or units each having one or more memory subsystems 110 according to the present invention for storing data therein will now be described with reference to FIG. 4. FIG. 4 is a block diagram of a memory system (100) having a network attached storage (NAS) architecture. Although memory system 100 is shown as having only two memory matrix modules 105 each with a single memory subsystem 110 (shown in phantom), it will be appreciated that the memory system can be scaled to include any number of memory matrix modules having any number of memory subsystems depending on the memory capacity desired. In addition, memory system 100 can be used with a single data processing system 115, such as a computer or PC, or can be coupled to a data processing network or data network 120 to which several data processing systems are connected. Data network 120 can be based on either a physical connection or wireless connection as described infra. By physical connection it is meant any link or communication pathway, such as wires, twisted pairs, coaxial cable, or fiber optic line or cable, that connects between memory system 100 and data network 120 or data processing system 115. For purposes of clarity, many of the details of data processing systems 115 and data networks 120 that are widely known and are not relevant to the present invention have been omitted. In addition to memory matrix modules 105 with memory subsystems 110, memory system 100 typically includes one or more management modules (MGT) 125 or units to interface between the memory subsystems and data network 120; one or more non-volatile storage modules (NVSM) 130 or units to backup data stored in the memory matrix modules; one or more off-line storage modules (OLSM) 135 or units having removable storage media (not shown) to provide an additional backup of data; and an uninterruptible power supply (UPS) 140 to supply power from an electrical power line to the memory matrix modules 105 and to modules 125, 130, 135, via a power bus 145. The modules 105, 125, 130, 135, of the memory system 100 are coupled to one another and to data processing systems 115 or the data network 120 via a local area network (LAN) or data bus 150. To provide increased reliability and throughput, the memory system 100 can include any number of management modules (MGT) 125, non-volatile storage modules (NVSM) 130, and off-line storage modules (OLSM) 135. Operation of memory matrix modules 105, UPS 140 and other modules 130, 135, is controlled by management module 125 via primary and secondary internal system buses (not shown in this figure) and via a power management bus 155.

Although memory system 100 and method of the present invention are described in context of a memory system having NAS architecture, it will be appreciated that the memory system and method of the present can also be used with memory systems having a storage area network (SAN) architecture using expansion cards 156 and coupled to the data network 120 via, for example, a Fibre Channel-Arbitrated Loop connection 158, as shown in FIG. 5.

The various components, modules and subsystems of memory 100 will now be described in more detail with reference to FIGS. 6 through 11.

FIG. 6 is a partial block diagram of a portion of memory system 100 showing the memory matrix module 105 according to an embodiment of the present invention. Referring to FIG. 6, memory matrix module 105 contains a primary internal system bus 160 that is coupled through a bridge or switch 165 to a secondary internal system bus 170. The memory matrix module 105 is coupled to management module 125, non-volatile storage module 130 and off-line storage module 135 and to data processing system 115 or data network 120 (not shown this figure), through a network interface card or controller (NIC) 175, a switch 180, a number of physical links 185 such as Gigabit Interface Converters (GBICs), and one or more individual connections on the LAN or data bus 150. The redundant paths taken by connections to the LAN or data bus 150 between the switches 180 of the modules 105, 125, 130, 135, of the memory system 100 form a 'mesh' or fabric type of network architecture that provides increased fault tolerance through path redundancy, and higher throughput during normal operation when all paths are operating correctly.

Switch 180 enables management module 125, non-volatile storage module 130, off-line storage module 135 and data processing systems (not shown in this figure) connected to any of the connections on LAN or data bus 150, to access any memory subsystem 110 in memory matrix module 105. Switch 180 can be a switching fabric or a cross-bar type switch capable of wire-speed operation running at full gigabit speeds, and having dynamic packet buffer memory allocation, multi-layer switching and filtering (Layer 2 and Layer 3 switching and Layer 4–7 filtering), and integrated support for class of service priorities required by multimedia applications. One example is the BCM5680 8-Port Gigabit Switch from Broadcom Corporation of Irvine, Calif., USA.

In the embodiment shown, memory matrix module 105 further includes security processor 200 for specific additional data processing and manipulation, and UPS power management interface 205 to enable the memory matrix module to interface with uninterruptible power supply 140. Security processor 200 can be any commercially available device that integrates a high-performance IPSec engine handling DES, 3DES, HMAC-SHA-1, and HMAC-MD5, public key processor, true random number generator, context buffer memory, and PCI or equivalent interface. One example is a BCM5805 Security Processor from Broadcom Corporation of Irvine, Calif., USA.

Optionally, memory matrix module 105 can further include additional dedicated function processors 210, 215, on secondary internal system bus 170 connected to primary internal system bus 160 via switch 165 for specific additional data processing and manipulation. Dedicated function processors 210, 215, have associated therewith flash programmable read only memory or ROM 220, 225, to boot the dedicated CPUs and/or memory subsystems 110, and RAM 230, 235, to provide buffer memory to the dedicated CPUs.

Expansion slot or slots 240, coupled to memory subsystems 110 via switch 165 and primary and secondary internal system buses 160, 170, can be used to connect additional I/O or peripheral modules such as ten gigabit Ethernet, Fibre Channel-Arbitrated Loop, and serial I/O to the memory system 100.

Wireless module 245 also coupled to memory subsystems 110 through switch 165 and primary and secondary internal system buses 160, 170, can be used to couple the memory system 100 to additional data processing systems or data networks via a wireless connection.

An exemplary embodiment of memory subsystem 110 will now be described with reference to FIG. 7. As shown in FIG. 7, memory subsystem 110 generally includes a number of memory devices 250, each capable of storing data therein, arranged in a memory array 255 having a plurality of banks 260, each bank each having a predetermined number of memory devices. Memory subsystem 110 can include any number of memory devices 250 arranged in any number of banks 260 depending on the data storage capacity needed.

Typically, memory devices 250 include Random Access Memory (RAM) devices. RAM devices are integrated circuit memory chips that have a number of memory cells for storing data, each memory cell capable of being identified by a unique physical address including a row and column number. Some of the more commonly used RAM devices include dynamic RAM (DRAM), fast page mode (FPM) DRAM, extended data out RAM (EDO RAM), burst EDO RAM, static RAM (SRAM), synchronous DRAM (SDRAM), Rambus DRAM (RDRAM), double data rate SDRAM (DDR SDRAM), and future RAM technologies as they become commercially available. Of these SDRAM is currently preferred because it is faster than EDO RAM, and is less expensive than SRAM.

Alternatively, memory devices 250 can include devices, components or systems using holography, atomic resolution storage or molecular memory technology to store data. Holographic data storage systems (HDSS) split a laser beam. A 'page' of data is then impressed on one of the beams using a mask or Spatial Light Modulator (SLM) and the components of the split beam aimed so that they cross. The beams are directed so that they intersect to form an interference pattern of light and dark areas within a special optical material that reacts to light and retains the pattern to store the data. To read stored data the optical material is illuminated with a reference beam, which interacts with the interference pattern to reproduce the recorded page of data. This image is then transferred to data processing system using a Charge-Coupled Device (CCD).

Molecular memory uses protein molecules which react with light undergoing a sequence of structural changes known as a photocycle. Data is stored in the protein molecules with an SLM in a manner similar to that used in HDSS. Both HDSS and molecular memories can achieve data densities of about 1 terabyte per cubic centimeter.

Atomic resolution storage or ARS systems use an array of atom-size probe tips to read and write data on a storage media consisting of a material having two distinct physical states, or phases, that are stable at room temperature. One phase is amorphous, and the other is crystalline. Data is recorded or stored in the media by heating portions spots of the media to change them from one phase to the other. ARS systems can provide memory devices with data densities greater than about 1 terabyte per cubic centimeter.

In addition to array 255, memory subsystem 110 generally includes a memory controller 265 for accessing data in the memory devices of the memory matrix, and a cache 270 connected to the memory controller having one or more copies of a file or Data Allocation Table (DAT) stored therein for organizing data in the memory subsystem 110 or array 255. In accordance with the present invention, the DAT is adapted to provide one of several possible methods for organizing data in memory subsystem 110. Under one method memory subsystem 110 is partitioned and each partition divided into clusters. Each cluster is either allocated to a file or directory or it is free (unused). A directory lists the name, size, modification time, access rights, and starting cluster of each file or directory it contains. A special value for "not allocated" indicates a free cluster or the beginning of a series of free clusters.

Under another method for organizing data in memory subsystem 110, the DAT may set aside customized partition and cluster configurations to achieve particular optimizations in data access. An analogous example of this method from hard disk drive based databases is the creation of nonstandard partitions on hard disk drives to store certain data types such as large multimedia files or small Boolean fields in such a way that data queries, updates, manipulation, and retrieval are optimized. However, customized partition and cluster configurations are generally not available with conventional hard disk controllers, which are generically optimized for the most common data types.

I/OCPU 275 and memory controller 265 generally include hardware and software to interface between management module 125 and banks 260 of memory devices 250 in memory array 255. The hardware and/or software include a protocol to translate logical addresses used by a data processing system 115 into physical addresses or locations in memory devices 250. Optionally, memory controller 265 and memory devices 250 also include logic for implementing an error detection and correction scheme for detecting and correcting errors in data transferred to or stored in memory subsystem 110. The error detection and correction can be accomplished, for example, using a Hamming code. Hamming codes add extra or redundant bits, such as parity bits, to stored or transmitted data for the purposes of error detection and correction. Hamming codes are described in, for example, U.S. Pat. No. 5,490,155, which is incorporated herein by reference. Alternatively, memory devices 250 can include a technology, such as Chipkill, developed by IBM Corporation, that enables the memory devices themselves to automatically and transparently detect and correct multi-bit errors and selectively disable problematic parts of the memory.

In one embodiment, memory controller 265 can be any suitable, commercially available controller for controlling a data storage device, such as a hard disk drive controller. A suitable memory controller should be able to address from about 2 GB to about 48 GB of memory devices 250 arranged in from about eight to about forty-eight banks 260, have at least a 133 MHz local bus, and one or more Direct Memory Access (DMA) channels. One example would be the V340BPC PCI System Controller from V3 Semiconductor Corporation of North York, Ontario, Canada. I/O CPU 275 receives memory requests from primary internal system bus 160 and passes the requests to memory controller 265 through local bus 300. I/O CPU 275 serves to manage the reading and writing of data to banks 260 of memory devices 250 as well as manipulate data within the banks of memory devices.

By manipulate data it is meant defragmenting the memory array 255, encryption and/or decryption of data to be stored in or read from the array, and data optimization for specific applications. Defragmenting physically consolidates files and free space in the array 255 into a continuous group of sectors, making storage faster and more efficient. Encryption refers to any cryptographic procedure used to convert plaintext into ciphertext in order to prevent any but the intended recipient from reading that data. Data optimization entails special handling of specific types of data or data for specific applications. For example, some data structures commonly used in scientific applications, such as global climate modeling and satellite image processing, require periodic or infrequent processing of very large amounts of streaming data. By streaming data it is meant data arrays or sequential data that are accessed once by the data processing system 115 and then not accessed again for a relatively long time.

A read-only memory (ROM) device 280 having an initial boot sequence stored therein is coupled to I/O CPU 275 to boot memory subsystem 110. A RAM device 285 coupled to I/O CPU 275 provides a buffer memory to the I/O CPU. The I/O CPU 275 can be any commercially available device having a speed of at least 600 MHz and the capability of addressing at least 4 GB of memory. Suitable examples include a 2 GHz Pentium® 4 processor commercially available from Intel Corporation of Santa Clara, Calif., USA, and an Athlon®, 1.5 GHz processor commercially available from Advanced Micro Devices, Inc. of Sunnyvale, Calif., USA.

Preferably, ROM device 280 is an electronically erasable or flash programmable ROM (EEPROM) that can be programmed to enable the management module 125 to operate according to the present invention. More preferably, ROM device 280 has from about 32 to about 128 Mbits of memory. One suitable EEPROM, for example, is a 28F6408W30 Wireless Flash Memory with SRAM from Intel Corporation of Santa Clara, Calif., USA.

After data access has been initiated through I/O CPU 275, data in memory array 255 is passed through memory controller 265 directly to the primary internal system bus 160 via a dedicated bus or communications pathway 290. Optionally, memory controller 265 can include multiple controllers or parallel input ports (not shown) to enable another CPU, such as dedicated function CPUs 210 or 215 to access the memory controller directly via communications pathway 290 in the event of a failure of I/O CPU 275.

Referring to FIG. 8, memory controller 265 typically includes a local bus interface 305 to connect via local bus 300 to I/O CPU 275, and a PCI or equivalent system bus interface 310 to connect to primary internal system bus 160 via communications pathway 290. Although not shown in this figure, it will be appreciated that memory controller 265 may be connected to more than one local bus 300 or I/O CPU 275, and, similarly, to more than one PCI or equivalent primary internal system bus 160 to provide added redundancy and high availability. Memory controller 265 also generally includes a first in, first out (FIFO) storage memory buffer 315, one or more direct memory access (DMA) channels 320, a serial EEPROM controller 325, an interrupt controller 330, and timers 335. In addition, memory controller 265 includes a memory array controller 340 that interfaces with memory array 255 managed by memory controller 265. Optionally, memory controller 265 can include a plurality of memory array controllers (not shown) connected in parallel to provide increased reliability.

Management module 125 will now be described in detail with reference to FIG. 9. As noted above memory system 100 can include one or more management modules 125 to provide increased reliability and high availability of data through redundancy, and/or to increase data throughput by partitioning the memory available in memory matrix modules 105 and dedicating each management module to a portion of memory or to a special function. For example, one management module 125 may be dedicated to handling streaming data such as video or audio files.

Management module 125 generally includes I/O CPUs 275 coupled to memory controllers 265 in each memory subsystem 110 (not shown in this figure), each I/O CPU 275 having ROM device 280 and RAM device 285. In memory systems 100 having multiple management modules 125, ROM device 280 can have stored therein an initial boot sequence to boot the management module as a controlling management module 125.

Referring to FIG. 9, management module 125 is also coupled to memory matrix module(s) 105, non-volatile storage module 130, and off-line storage module 135 and to data processing system 115 or data network 120 (not shown this figure), through a network interface card or controller (NIC) 350, a switch 355, a number of physical links 360 such as Gigabit Interface Converters (GBICs), and one or more individual connections on LAN or data bus 150.

Switch 355 enables management module 125 to couple data processing systems connected to data network 120 (not shown in this figure) to non-volatile storage module 130, off-line storage module 135 and any memory subsystem 110 in any memory matrix module 105. As with switch 180 described above, switch 355 can be a switching fabric or a cross-bar type switch capable of wire-speed operation running at full gigabit speeds, and having dynamic packet buffer memory allocation, multi-layer switching and filtering (Layer 2 and Layer 3 switching and Layer 4–7 filtering), and integrated support for class of service priorities required by multimedia applications. One example is the BCM5680 8-Port Gigabit Switch from Broadcom Corporation of Irvine, Calif., USA.

In the embodiment shown, management module 125 further includes security processor 370 for specific additional data processing and manipulation, and UPS power management interface 375 to enable the management module to interface with uninterruptible power supply 140. Security processor 370 can be any commercially available device that integrates a high-performance IPSec engine handling DES, 3DES, HMAC-SHA-1, and HMAC-MD5, public key processor, true random number generator, context buffer memory, and PCI or equivalent interface. One example is a BCM5805 Security Processor from Broadcom Corporation of Irvine, Calif., USA.

Optionally, management module 125 can further include additional dedicated function processors 385, 390, on secondary internal system bus 170 connected to primary internal system bus 160 via bridge 365 for specific additional data processing and manipulation. Dedicated function processors 385, 390, have associated therewith flash programmable read only memory or ROM 395, 400, to boot the dedicated CPUs and/or management module 125, and RAM 405, 410, to provide buffer memory to the dedicated CPUs.

Expansion slot or slots 415 can be used to connect additional I/O or peripheral modules such as ten gigabit Ethernet, Fibre Channel-Arbitrated Loop, and serial I/O to management module 125.

Wireless module 420 can be used to couple management module 125 to additional data processing systems or data networks via a wireless connection.

An exemplary embodiment of non-volatile storage module 130 will now be described in detail with reference to FIG. 10. In general, non-volatile storage module 130 includes one or more non-volatile storage devices 425, such as hard disk drives, controller 430 to operate the non-volatile storage devices, and RAM device 435 to provide a buffer memory to the controller. The data stored in non-volatile storage devices 425 can be backed up directly from memory matrix module 110 or streamed from data network 120 in a manner described below.

Generally, non-volatile storage devices 425 can include magnetic, optical, or magnetic-optical disk drives. Alternatively, non-volatile storage devices 425 can include devices or systems using holographic, molecular memory or atomic resolution storage technology as described above. Preferably, non-volatile storage module 130 includes a number of hard disk drives as shown. More preferably, the hard disk drives are connected in a RAID configuration to provide higher data transfer rates between memory matrix module 110 and non-volatile storage module 130 and/or to provide increased reliability.

There are six basic RAID levels, each possessing different advantages and disadvantages. These levels are described in, for example, an article titled "A Case for Redundant Arrays of Inexpensive Disks (RAID)" by David A. Patterson, Garth Gibson and Randy H. Katz; University of California Report No. UCB/CSD 87/391, December 1987, which is incorporated herein by reference. RAID level 2 uses non-standard disks and as such is not normally commercially feasible.

RAID level 0 employs "striping" where the data is broken into a number of stripes which are stored across the disks in the array. This technique provides higher performance in accessing the data but provides no redundancy which is needed in the event of a disk failure.

RAID level 1 employs "mirroring" where each unit of data is duplicated or "mirrored" onto another disk drive. Mirroring requires two or more disk drives. For read operations, this technique is advantageous since the read operations can be performed in parallel. A drawback with mirroring is that it achieves a storage efficiency of only 50%.

In RAID level 3, a data block is partitioned into stripes which are striped across a set of drives. A separate parity drive is used to store the parity bytes associated with the data block. The parity is used for data redundancy. Data can be regenerated when there is a single drive failure from the data on the remaining drives and the parity drive. This type of data management is advantageous since it requires less space than mirroring and only a single parity drive. In addition, the data is accessed in parallel from each drive which is beneficial for large file transfers. However, performance is poor for high input/output request (I/O) transaction applications since it requires access to each drive in the array.

In RAID level 4, an entire data block is written to a disk drive. Parity for each data block is stored on a single parity drive. Since each disk is accessed independently, this technique is beneficial for high I/O transaction applications. A drawback with this technique is the single parity disk which becomes a bottleneck since the single parity drive needs to be accessed for each write operation. This is especially burdensome when there are a number of small I/O operations scattered randomly across the disks in the array.

In RAID level 5, a data block is partitioned into stripes which are striped across the disk drives. Parity for the data blocks is distributed across the drives thereby reducing the bottleneck inherent to level 4 which stores the parity on a single disk drive. This technique offers fast throughput for small data files but performs poorly for large data files. Other somewhat non-standard RAID levels or configurations have been proposed and are in use. Some of these combine features of RAID configuration levels already described.

Thus, for example, non-volatile storage module 130 can comprise hard disk drives connected in a RAID Level 0 configuration to provide the highest possible data transfer rates, or in a RAID Level 1 configuration to provide multiple mirrored copies of data in memory matrix module 110.

An I/O CPU 440 is coupled to controller 430 for managing the reading, writing and manipulation of data to volatile storage devices. A read-only memory (ROM) device 445 having an initial boot sequence stored therein is coupled to I/O CPU 440 to boot non-volatile storage module 130. A RAM device 450 coupled to I/O CPU 440 provides a buffer memory to the I/O CPU.

As with I/O CPU 275 described above, I/O CPU 440 in non-volatile storage module 130 can be any commercially available device having a speed of at least 600 MHz and the capability of addressing at least 4 GB of memory. Suitable examples include a 2 GHz Pentium® 4 processor commercially available from Intel Corporation of Santa Clara, Calif., USA, and an Athlon®, 1.5 GHz processor commercially available from Advanced Micro Devices, Inc. of Sunnyvale, Calif., USA.

Preferably, ROM device 445 is an electronically erasable or flash programmable ROM (EEPROM) that can be programmed to enable non-volatile storage module 130 to operate according to the present invention. More preferably, ROM device 445 has from about 32 to about 128 Mbits of memory. One suitable EEPROM, for example, is a 28F6408W30 Wireless Flash Memory with SRAM from Intel Corporation of Santa Clara, Calif., USA.

Non-volatile storage module 130 is coupled to management module 125, memory matrix module(s) 105, off-line storage module 135 and to data processing system 115 or data network 120 (not shown in this figure), through a network interface card or controller (NIC) 455, a switch 460, a number of physical links 465 such as Gigabit Interface Converters (GBICs), and one or more individual connections on LAN or data bus 150.

Switch 460 enables management module 125, memory matrix module 105, off-line storage module 135 and data processing systems (not shown in this figure) connected to any of the connections on LAN or data bus 150, to access any non-volatile storage device 425 in non-volatile storage module 130. As with the switches described above, switch 460 can be a switching fabric or a cross-bar type switch capable of wire-speed operation running at full gigabit speeds, and having dynamic packet buffer memory allocation, multi-layer switching and filtering (Layer 2 and Layer 3 switching and Layer 4–7 filtering), and integrated support for class of service priorities required by multimedia applications. One example is the BCM5680 8-Port Gigabit Switch from Broadcom Corporation of Irvine, Calif., USA.

In the embodiment shown, non-volatile storage module 130 further includes security processor 470 for specific additional data processing and manipulation, and UPS power management interface 475 to enable the non-volatile storage module to interface with uninterruptible power supply 140. Security processor 470 can be any commercially available device that integrates a high-performance IPSec engine handling DES, 3DES, HMAC-SHA-1, and HMAC-MD5, public key processor, true random number generator, context buffer memory, and PCI or equivalent interface. One example is a BCM5805 Security Processor from Broadcom Corporation of Irvine, Calif., USA.

Optionally, non-volatile storage module 130 can further include additional dedicated function processors 480, 485, on secondary internal system bus 170 connected to primary internal system bus 160 via bridge 487 for specific additional data processing and manipulation. Dedicated function processors 480, 485, have associated therewith flash programmable read only memory or ROM 490, 495, to boot the dedicated CPUs and/or non-volatile storage module 130, and RAM 500, 505, to provide buffer memory to the dedicated CPUs.

Expansion slot or slots 510 can be used to connect additional I/O or peripheral modules such as ten gigabit Ethernet, Fibre Channel-Arbitrated Loop, and serial I/O to non-volatile storage module 130.

Wireless module 515 can be used to couple non-volatile storage module 130 to additional data processing systems or data networks via a wireless connection.

An exemplary embodiment of off-line storage module 135 will now be described in detail with reference to FIG. 11. Off-line storage module 135 includes one or more removable media drives 520 each with a removable storage media such as magnetic tape or removable magnetic or optical disks to provide additional non-volatile backup of data in memory matrix module 110. Removable media drive controller 525 operates removable media drives 520, and RAM device 530 provides a buffer memory to the controller.

Off-line storage module 135 has the advantage of providing a permanent "snapshot" image of data in memory matrix module 105 that will not be victimized by subsequent data written to the memory matrix module from data network 120. Preferably, because of the long time necessary to write data to the removable storage media relative to the rapidity with which data in memory matrix module 105 can change, the data is copied from non-volatile storage module 130 to the removable storage media in off-line storage module 135 on a regular, periodic basis. Alternatively, the data can be copied directly from memory matrix module 105.

An I/O CPU 535 is coupled to controller 525 for managing the reading and writing of data to removable media drives 520. ROM device 540 having an initial boot sequence stored therein is coupled to I/O CPU 535 to boot off-line storage module 135. RAM device 545 coupled to I/O CPU 535 provides a buffer memory to the I/O CPU.

As with I/O CPU 275 and 440, I/O CPU 535 in off-line storage module 135 can be any commercially available device having a speed of at least 600 MHz and the capability of addressing at least 4 GB of memory. Suitable examples include a 2 GHz Pentium® 4 processor commercially available from Intel Corporation of Santa Clara, Calif., USA, and an Athlon®, 1.5 GHz processor commercially available from Advanced Micro Devices, Inc. of Sunnyvale, Calif., USA.

Preferably, ROM device 540 is an electronically erasable or flash programmable ROM (EEPROM) that can be programmed to enable off-line storage module 135 to operate according to the present invention. More preferably, ROM device 540 has from about 32 to about 128 Mbits of memory. One suitable EEPROM, for example, is a 28F6408W30 Wireless Flash Memory with SRAM from Intel Corporation of Santa Clara, Calif., USA.

Off-line storage module 135 is coupled to management module 125, memory matrix module(s) 105, non-volatile storage module 130 and to data processing system 115 or data network 120 (not shown in this figure), through a network interface card or controller (NIC) 550, a switch 555, a number of physical links 560 such as Gigabit Interface Converters (GBICs), and one or more individual connections on LAN or data bus 150.

Switch 555 enables management module 125, memory matrix module 105 nonvolatile storage module 130 and data processing systems (not shown in this figure) connected to any of the connections on LAN or data bus 150, to access data in any removable media drive 520 in off-line storage module 135. As with the switches described above, switch 555 can be a switching fabric or a cross-bar type switch capable of wire-speed operation running at full gigabit speeds, and having dynamic packet buffer memory allocation, multi-layer switching and filtering (Layer 2 and Layer 3 switching and Layer 4–7 filtering), and integrated support for class of service priorities required by multimedia applications. One example is the BCM5680 8-Port Gigabit Switch from Broadcom Corporation of Irvine, Calif., USA.

In the embodiment shown, off-line storage module 135 further includes security processor 570 for specific additional data processing and manipulation, and UPS power management interface 575 to enable the off-line storage module to interface with uninterruptible power supply 140. Security processor 570 can be any commercially available device that integrates a high-performance IPSec engine handling DES, 3DES, HMAC-SHA-1, and HMAC-MD5, public key processor, true random number generator, context buffer memory, and PCI or equivalent interface. One example is a BCM5805 Security Processor from Broadcom Corporation of Irvine, Calif., USA.

Optionally, off-line storage module 135 can further include additional dedicated function processors 580, 585, on secondary internal system bus 170 connected to primary internal system bus 160 via bridge 565 for specific additional data processing and manipulation. Dedicated function processors 580, 585, have associated therewith flash programmable read only memory or ROM 590, 595, to boot the dedicated CPUs and/or off-line storage module 135, and RAM 600, 605, to provide buffer memory to the dedicated CPUs.

Expansion slot or slots 610 can be used to connect additional I/O or peripheral modules such as ten gigabit Ethernet, Fibre Channel-Arbitrated Loop, and serial I/O to off-line storage module 135.

Wireless module 615 can be used to couple off-line storage module 135 to additional data processing systems or data networks via a wireless connection.

Uninterruptible power supply 140 supplies power from the electrical power line (not shown) to management module 125, memory matrix modules 105, non-volatile storage module 130, and off-line storage module 135 through power bus 145. In the event of an excessive fluctuation or interruption in power from the electrical power line, UPS 140 supplies backup power from a battery (not shown). Preferably, because the backup power from a battery is limited, uninterruptible power supply 140 is configured to transmit a signal to management module 125 on excessive fluctuation or interruption in power from the electrical power line, and the management module is configured to backup the memory matrix module 105 to non-volatile storage module 130 and/or off-line storage module 135 upon receiving the signal. More preferably, management module 125 is further configured to notify users of memory system 100 of the power failure and to perform a controlled shutdown of the memory system. Optionally, if uninterruptible power supply 140 has a longer term alternate power source such as a diesel generator, management module 125 can be configured to continue to use memory matrix modules 105 or to switch to non-volatile storage module 130 for greater data safety, thereby allowing users of mission-critical applications to continue their work without interruption.

Some of the important aspects of the present invention will now be repeated to further emphasize their structure, function and advantages.

In one aspect, multiple links connect or couple management module 125 to data network 120, memory matrix modules 105, non-volatile storage module 130, and off-line storage module 135. This 'mesh' or fabric type redundancy provides a higher data transfer rate during normal operations and the ability to continue operations on a reduced number of buses in a failover mode. These multiple links typically include a set of one or more conductors and a network interface (not shown) using an interface standard such as gigabit Ethernet, ten gigabit Ethernet, Fibre Channel-Arbitrated Loop (FC-AL), Firewire, Small Computer System Interface (SCSI), Advanced Technology Attachment (ATA), InfiniBand, HyperTransport, PCI-X, Direct Access File System (DAFS), IEEE 803.11, or Wireless Application Protocol (WAP).

In one embodiment, management module 125 intermediates between data network 120 and memory matrix modules 105, non-volatile storage modules 130, and off-line storage modules (135). During normal operation, memory matrix module 105 is accessed by data network 120 through management module 125 over primary internal system bus 160 to serve as a primary memory system. At the same time, the same data and data transactions are mirrored to a second memory matrix module 105 to provide a backup memory system. The data in the second memory module 105 is then backed up to a non-volatile storage module on an incremental basis whereby only changed data is backed up. This arrangement has the advantage that in the event of an impending power failure, only data in buffer memory or RAM 285 in memory subsystems 110 needs to be written to non-volatile storage module 130 to provide a complete backup of data in memory arrays 255. This shortens the backup time and the power demand placed on the battery of uninterruptible power supply module 140. It should be noted that data can be written to off-line storage module 135 in a similar manner.

In addition, in one version of this embodiment, management module 125 is further configured to detect failure or a non-operating condition of the primary memory, and to reconfigure memory system 100 to enable data network 120 to access data in secondary backup memory matrix modules 105, or non-volatile storage module 130 if the memory matrix modules are unavailable. Thus, the failover to a backup memory is completely transparent to a user of data processing system 115 attached to data network 120.

Optionally, the management module 125 is further configured to provide a failback capability in which restoration of the primary memory matrix module 105 is detected, and the contents of the memory matrix module automatically restored from the backup memory matrix modules or non-volatile storage module 130. Preferably, the management module 125 is configured to reactivate the memory matrix 105 as the primary memory. More preferably, the management module 125 is also configured to reactivate other memory matrixes as secondary or backup memories, thereby returning the memory system to normal operating condition.

Similarly, in another optional embodiment, the memory system 100 has several memory matrix modules 105, each of configured to couple directly to the data network 120 in case of failure of the management module 125, thereby providing backup or failover capability for the management module. The memory matrix modules 105 can be coupled to the data network 120 in a master-slave arrangement in which one of the memory matrix modules, for example a primary memory matrix module, functions as the management module 125 coupling all of the remaining memory matrix modules to the data network. Alternatively, all of the memory matrix modules 105 can be configured to couple to the data network 120, thereby providing a peer to peer network of memory matrix modules. Thus, the memory system 100 of the present invention provides complete and redundant backup or failover capability for all components of the memory system. That is, in case of failure of a primary memory matrix module 105, the management module 125 is configured to couple a secondary memory matrix module to the data network 120 to provide a backup of data in the primary memory matrix module. In case of subsequent failure of the secondary memory matrix module, the management module 125 is configured to couple the NVSM or OLSM to the data network 120. It will be appreciated that this unparalleled redundancy is achieved through the use of substantially identical programmable components, such as the controllers, which can be quickly reconfigured through alteration of their programming to function in other capacities.

A method for operating memory system 100 will now be described with reference to FIG. 12. FIG. 12 is a flowchart showing an embodiment of a process for operating a memory system having at least one memory matrix module 105 according to an embodiment of the present invention. In the method, data from data network 120, is received in management module 125 (Step 620) and transferred to memory controller 265 of a memory subsystem 110 via primary internal system bus 160 (Step 625). The DAT associated with memory subsystem 110 is checked to determine an address or location in memory array 255 in which to store the data (Step 630). The data is then stored to memory array 255 at a specified address (Step 635). Typically, this involves the sub-steps (not shown) of applying a row address and a column address, and applying data to one or more ports on one or more memory devices 250. Optionally, the method includes the further steps of mirroring the same data to a second memory subsystem or memory matrix module 105 (Step 640), which is then backed up by streaming its data to non-volatile storage module 130 (Step 645). If failure or a non-operating condition of primary memory, that is the first memory subsystem 110, is detected by the management module (Step 650), the management module will reconfigure the memory system 100 to enable data network 120 to directly access the data in the second memory subsystem, secondary memory matrix module or non-volatile storage module 130 (Step 655). This last step, step 655, allows the memory system to continue operation in a manner transparent to the user of the system.

EXAMPLES

The following examples illustrate advantages of a memory system and method according to the present invention for storing data in a network attached configuration. The examples are provided to illustrate certain embodiments of the present invention, and are not intended to limit the scope of the invention in any way.

In these examples, performance characteristics of 1.5 gigabytes (GB) of RAM memory configured to model an active storage memory system according to the present invention were compared with the performance of an IBM DeskStar® 43 GB, 7200 rpm hard disk drive operating on an ATA 66 bus, and a Maxtor 20 GB, 7200 rpm hard disk drive operating on an ATA 100 bus, using the industry standard Intel IOMeter software program to generate storage I/O benchmarks.

In a first example, a typical database configuration was used. Multiple data files of 2048 bytes each were written to and subsequently read from each of the three memory systems, i.e., the active storage memory system and the hard drives. The read operations comprised 67% of all operations, the write operations comprised 33% of all operations, and the order in which files were accessed was completely random. In this example, the active storage memory system averaged 26,552.242 I/O operations per second (IOps). The Deskstar and Maxtor hard drives averaged 79.723 and 89.610 respectively. Thus, the active memory system was 333 times faster than the DeskStar and 296 times faster than the Maxtor in the rate at which it was able to perform I/O operations.

In a second example, a typical data streaming configuration was used. Large files of 65,536 bytes were read in sequential order from each of the three memory systems. No writes were performed. The active storage memory system averaged 4,513.751 IOps. The Deskstar and Maxtor hard drives averaged 343.459 and 421.942 respectively. Thus, the active memory system was 13.14 and 10.70 times faster than the DeskStar and the Maxtor respectively.

In a third example, multiple files of 512 bytes each were read from each of the three memory systems. The read operations comprised 100% of all operations, and the order of the files was strictly sequential thereby minimizing or eliminating the effect of seek time and rotational latency on hard disk drive performance. In this example, the active storage memory system averaged 5,432.898 IOps. The Deskstar and Maxtor hard drives averaged 4,888.884 and 5,017.892 respectively. Thus, the active memory system was 1.11 and 1.08 times faster than the DeskStar and the Maxtor respectively.

In a fourth example, the conditions of the third test were repeated with the exception that the order in which files were read or accessed was completely random, more typical of real-world conditions. The active storage memory system averaged 30,272.041 IOps. The Deskstar and Maxtor hard drives averaged 83.807 and 82.957, or were 361.21 and 364.91 times slower respectively.

It is to be understood that even though numerous characteristics and advantages of certain embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A memory matrix module for use in a data network, comprising:
    at least one memory array having a plurality of memory devices arranged in a plurality of banks, each memory device capable of storing data therein;
    at least one memory controller coupled to the memory array and capable of accessing the memory devices; and
    a cache coupled to the memory controller, the cache having stored therein one or more copies of a data allocation table (DAT) adapted to describe data stored in the memory devices.

2. The memory matrix module of claim 1, wherein each of the banks has multiple ports, and wherein the multiple ports and the DAT in the cache enable the memory controller to access different memory devices in different banks simultaneously.

3. The memory matrix module of claim 1, wherein the data network is configured to connect a plurality of data processing systems to the memory system, and wherein the memory matrix module is configured to enable different data processing systems to access the memory array simultaneously.

4. The memory matrix module of claim 3, wherein the memory matrix module is configured to enable a first data processing system to write to the memory array while simultaneously a second data processing system reads from the memory array.

5. The memory matrix module of claim 1, wherein the memory devices comprise random access memory (RAM) devices.

6. A memory system for storing data therein for use in a data network, the memory system comprising:
    at least one memory matrix unit having at least one memory subsystem, the memory subsystem including:
        a memory array having a plurality of memory devices arranged in a plurality of banks, each memory device capable of storing data therein;
        a memory controller coupled to the memory array and capable of accessing the memory devices; and
        a cache coupled to the memory controller, the cache having stored therein one or more copies of a data allocation table (DAT) adapted to describe data stored in the memory devices; and at least one management unit coupled to at least one memory matrix unit and to the data network to interface between the memory matrix unit and the data network.

7. The memory system of claim 6, wherein each of the banks has multiple ports, and wherein the multiple ports and the DAT in the cache enable the memory controller to access different memory devices in different banks simultaneously.

8. The memory system of claim 6, wherein the data network is configured to connect a plurality of data processing systems to the memory system, and wherein the memory system is configured to enable different data processing systems to access the memory array simultaneously.

9. The memory system of claim 8, wherein the memory system is configured to enable a first data processing system to write to the memory array while simultaneously a second data processing system reads from the memory array.

10. The memory system of claim 6, wherein the memory devices comprise random access memory (RAM) devices.

11. A memory system according to claim 6, further comprising a non-volatile storage unit having at least one non-volatile storage device to provide backup of data stored in the memory matrix unit.

12. The memory system of claim 11, wherein the non-volatile storage unit comprises a magnetic, optical, or magnetic-optical disk drive.

13. A memory system according to claim 11, wherein the non-volatile storage unit comprises a plurality of hard disk drives, and wherein the hard disk drives are connected in a RAID configuration to provide mirrored copies of data in at least one memory matrix unit.

14. The memory system of claim 11, wherein the non-volatile storage unit comprises a plurality of hard disk drives, and wherein the hard disk drives are connected in a RAID Level 0 configuration to reduce the time to backup data in at least one memory matrix unit.

15. The memory system of claim 11, wherein the non-volatile storage unit comprises a plurality of hard disk drives, and wherein the hard disk drives comprises a hard disk drive adapted to create a continuous backup of data in at least one memory matrix unit on a periodic basis.

16. The memory system of claim 6, further comprising an off-line storage unit having removable storage media to provide off-line storage of data stored in at least one memory matrix unit.

17. The memory system of claim 16, further comprising an uninterruptible power supply (UPS) configured to supply power to at least one management unit, at least one memory matrix unit, the non-volatile storage unit, and the off-line storage unit from an electrical power line, and, in the event of a variation in power from the electrical power line, to provide power from a battery.

18. The memory system of claim 17, wherein the UPS is configured to transmit a signal to the management unit on variation of power from the electrical power line exceeding a first predetermined amount, and wherein the management unit is configured to create a backup copy of at least one memory matrix unit in the non-volatile storage unit.

19. The memory system of claim 18, wherein at least one management unit is further configured, on variation of power from the electrical power line exceeding a second predetermined amount, to:

signal users of the memory system in the data network; and perform a controlled shutdown of the memory system.

20. The memory system of claim 18, wherein at least one management unit is further configured on restoration of power from the electrical power line to:

restore the contents of at least one memory matrix unit from the backup copy of the memory matrix stored in the non-volatile storage unit;

reactivate the memory matrix as a primary memory;

reactivate other memory matrixes as secondary memories if previously configured as secondary memories; and reactivate the non-volatile storage unit as a secondary memory, thereby returning the memory system to normal operating condition.

21. The memory system of claim 20, wherein at least one management unit is further configured on restoration of power from the electrical power line, if the non-volatile storage unit is unavailable, to restore at least one memory matrix unit directly from another backup copy of the memory matrix unit stored in removable storage media in an off-line storage unit.

22. The memory system of claim 6, wherein the data network is based on either physical wire or wireless connections.

* * * * *